(12) United States Patent
Abramson et al.

(10) Patent No.: US 8,879,707 B2
(45) Date of Patent: Nov. 4, 2014

(54) PRIVATE BRANCH EXCHANGE THAT MANAGES INTERACTIONS BETWEEN ASSOCIATED TELECOMMUNICATIONS TERMINALS

(75) Inventors: Sandra R. Abramson, Freehold, NJ (US); Stephen M. Milton, Freehold, NJ (US); Emil F. Stefanacci, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 2145 days.

(21) Appl. No.: 11/036,537

(22) Filed: Jan. 14, 2005

(65) Prior Publication Data
US 2006/0159248 A1    Jul. 20, 2006

(51) Int. Cl.
*H04M 3/42* (2006.01)
*H04M 3/56* (2006.01)
*H04M 3/16* (2006.01)

(52) U.S. Cl.
CPC  *H04M 3/56* (2013.01); *H04M 3/16* (2013.01); *H04M 3/42059* (2013.01); *H04M 3/4234* (2013.01)
USPC .................................................. 379/211.01

(58) Field of Classification Search
CPC ..... H04M 3/54; H04M 3/58; H04M 3/42314; H04M 1/006; H04M 3/42017
USPC ............. 379/211.01–214.01, 201.01, 201.02, 379/202.01, 203.01, 204.01, 205.01, 379/206.01, 207.01, 207.02, 207.11, 233, 379/158
See application file for complete search history.

(56) References Cited

U.S. PATENT DOCUMENTS

| | | | |
|---|---|---|---|
| 4,117,274 A * | 9/1978 | Cannon et al. | 379/161 |
| 4,150,257 A * | 4/1979 | Fenton et al. | 379/164 |
| 5,454,033 A | 9/1995 | Hahn et al. | |
| 5,694,462 A * | 12/1997 | Shearer | 379/211.02 |
| 5,815,563 A | 9/1998 | Ardon | |
| 5,926,537 A | 7/1999 | Birze | |
| 5,963,864 A | 10/1999 | O'Neil et al. | |
| 6,061,438 A | 5/2000 | Shen et al. | |
| 6,359,892 B1 * | 3/2002 | Szlam | 370/401 |
| 6,405,041 B1 * | 6/2002 | Mukerjee et al. | 455/445 |
| 6,574,335 B1 * | 6/2003 | Kalmanek et al. | 379/386 |

(Continued)

FOREIGN PATENT DOCUMENTS

| | | |
|---|---|---|
| DE | 198 08 368 A1 | 9/1999 |
| DE | 693 25 562 T2 | 12/1999 |

(Continued)

OTHER PUBLICATIONS

Avaya Inc. Aug. 2002, EC500 Extention to Cellular, Release 4, Installation and Administration Guide.*

(Continued)

*Primary Examiner* — Nafiz E Hoque
(74) *Attorney, Agent, or Firm* — Maldjian Law Group LLC; John Maldjian; Alexander D. Walter

(57) ABSTRACT

An apparatus and methods are disclosed that provide a plurality of telecommunications management features to a telecommunications terminal that is associated with a corresponding terminal through a private branch exchange. In particular, the illustrative embodiment enables a user to manage the simultaneous use of and interaction between associated telecommunications terminals. This capability can be particularly advantageous when on-premises telecommunications terminals are associated with off-premises telecommunications terminals.

14 Claims, 18 Drawing Sheets

(56) References Cited

U.S. PATENT DOCUMENTS

| | | | |
|---|---|---|---|
| 6,694,004 B1 * | 2/2004 | Knoerle et al. | 379/211.04 |
| 6,697,478 B1 * | 2/2004 | Meldrum et al. | 379/211.04 |
| 7,006,622 B2 | 2/2006 | Laine | |
| 2001/0040954 A1 * | 11/2001 | Brachman et al. | 379/211.02 |
| 2002/0034293 A1 * | 3/2002 | Horowitz et al. | 379/219 |
| 2002/0075879 A1 * | 6/2002 | Ramey | 370/401 |
| 2002/0132638 A1 * | 9/2002 | Plahte et al. | 455/555 |
| 2002/0181398 A1 * | 12/2002 | Szlam | 370/230 |
| 2004/0001518 A1 * | 1/2004 | Gilbert et al. | 370/525 |
| 2004/0114732 A1 | 6/2004 | Choe et al. | |
| 2004/0120493 A1 | 6/2004 | Creamer et al. | |
| 2004/0120494 A1 | 6/2004 | Jiang et al. | |
| 2004/0132435 A1 | 7/2004 | No et al. | |
| 2004/0179666 A1 | 9/2004 | Milton | |
| 2004/0258054 A1 * | 12/2004 | Kurganov | 370/352 |
| 2005/0105706 A1 | 5/2005 | Kokkinen | |
| 2005/0107128 A1 | 5/2005 | Deeds | |
| 2005/0117726 A1 | 6/2005 | DeMent et al. | |
| 2005/0207555 A1 | 9/2005 | Lee et al. | |
| 2006/0023862 A1 | 2/2006 | Sutcliffe | |
| 2006/0109968 A1 | 5/2006 | Hahm et al. | |
| 2006/0135158 A1 | 6/2006 | Lee et al. | |

FOREIGN PATENT DOCUMENTS

| | | | |
|---|---|---|---|
| EP | 0549126 A2 | 6/1993 | |
| EP | 0 805 581 A2 | 11/1997 | |
| EP | 1089533 A2 | 4/2001 | |
| EP | 1392041 A1 | 2/2004 | |
| EP | 1480430 A1 | 11/2004 | |
| GB | 2345222 A | 6/2000 | |
| JP | 2000050347 A * | 2/2000 | H04Q 7/34 |
| WO | 9726748 A1 | 7/1997 | |
| WO | 9750234 A2 | 12/1997 | |
| WO | 9848557 A1 | 10/1998 | |
| WO | 01/22706 A1 | 3/2001 | |
| WO | 0135616 | 5/2001 | |
| WO | 0211411 A1 | 2/2002 | |
| WO | 02/093884 A1 | 11/2002 | |
| WO | 03/030517 A2 | 4/2003 | |

OTHER PUBLICATIONS

D. Voisey, "GB Application No. GB 0600840.3 Examination Report", Sep. 2, 2008, Publisher: UK Intellectual Property Office, Published in: GB.

Voisey, Daniel, "GB Application No. 0900506.7 Search Report", Feb. 9, 2009, Publisher: UK Intellectual Property Office, Published in: GB.

"DE Application No. 102005062336.0 Office Action Feb. 13, 2009", Publisher: DE, Published in: DE.

"DE Application No. 102005062336.0 Office Action Feb. 2, 2007", Publisher: DE, Published in: DE.

"DE Application No. 102005063451.6 Office Action Feb. 16, 2009", Publisher: DE, Published in: DE.

Voisey, Daniel, "GB Application No. 0600840.3 Search Report May 18, 2006", Publisher: GB, Published in: GB.

Plarre, "DE Application No. 10 2005 062 336.0-56 Office Action Sep. 21, 2009", , Publisher: DPMA, Published in: DE.

Plarre, "DE Application No. 10 2005 063 451.6-56 Office Action Sep. 21, 2009", , Publisher: DPMA, Published in: DE.

Kharif, Olga, "America, Get Ready for Ringbacks," Business Week Online, Jun. 27, 2004, Retrieved Jul. 9, 2014 from http://www.businessweek.com/printer/articles/247858-america-get-ready-for-ringbacks?type=old_article, 3 pages.

* cited by examiner

PRIVATE BRANCH EXCHANGE THAT MANAGES INTERACTIONS BETWEEN ASSOCIATED TELECOMMUNICATIONS TERMINALS

FIELD OF THE INVENTION

The present invention relates to telecommunications in general, and, more particularly, to managing interactions at a private branch exchange between associated telecommunications terminals.

BACKGROUND OF THE INVENTION

FIG. 1 depicts a schematic diagram of telecommunications system 100 in the prior art. Telecommunications system 100 comprises affiliated off-premises telecommunications terminals 101-1 through 101-N, wherein N is a positive integer; unaffiliated off-premises telecommunications terminal 102; affiliated on-premises telecommunications terminals 103-1 through 103-N; private branch exchange telephone system 104; and telecommunications network 105, interconnected as shown.

The terms "affiliated" and "unaffiliated," as they apply to the off-premises terminals, refer to whether an off-premises terminal is affiliated with an on-premises terminal (i.e., a terminal served by private branch exchange 104). The relationship of an on-premises terminal (e.g., terminal 103-1, etc.) with an affiliated off-premises terminal (e.g., terminal 101-1, etc.) is described below and with respect to FIG. 2, with regards to extending a received call to one or both terminals.

Private branch exchange 104 is capable of switching incoming calls from telecommunications network 105 (e.g., the Public Switched Telephone Network, etc.) via one or more transmission lines to any of on-premises terminals 103-1 through 103-N. Private branch exchange 104 is also capable of handling outgoing calls from any of on-premises terminals 103-1 through 103-N to telecommunications network 105 via one or more transmission lines that connect private branch exchange 104 to telecommunications network 105.

Private branch exchange 104 is capable of also extending an incoming call to a telephone number in telecommunications network 105, in addition to switching the incoming call to on-premises terminal 103-n, wherein n has a value between 1 and N, inclusive. The telephone number that is extended-to in telecommunications network 105 corresponds to an affiliated terminal 101-n.

In addition, private branch exchange 104 is capable of providing telecommunications features that enable the forwarding of calls, the transferring of calls, conferencing, etc.

FIG. 1 also depicts the address spaces that are relevant to telecommunications network 100 in the prior art. The term "address space" refers to an addressable region of telephone service. Address space 111 represents the addressable region served by telecommunications network 105. Address space 112 represents the addressable region served by private branch exchange 104.

Private branch exchange 104 exists in both address space 111 and address space 112, and acts as a "bridge" between the two address spaces. When a calling party places a call to someone served by private branch exchange 104, the calling party uses a dialing sequence that includes a telephone number that belongs to telecommunications network 105 and residing in address space 111. As part of the dialing sequence, the calling party also uses an extension number that allows access to one of the on-premises telecommunications terminals that reside within address space 112.

Thus an on-premises telephone number is one that exists within the address space of the private branch exchange, and an off-premises telephone number is one that exists within the address space of the Public Switched Telephone Network.

FIG. 2 depicts a flowchart of the tasks that are relevant to processing an incoming call in the prior art. To accomplish tasks 201 through 203, private branch exchange 104 maintains a table that correlates telecommunications network number to private branch exchange extension. Table 1 depicts an illustrative table that correlates telecommunications network number to private branch exchange extension.

TABLE 1

Extension-to-Number Database

| Private Branch Exchange Extension | Telecommunications Network Number |
|---|---|
| 732-555-0102, x11 | 201-555-1236 |
| 732-555-0102, x12 | 908-555-3381 |
| . . . | . . . |
| 732-555-0102, x99 | 212-555-6784 |

At task 201, private branch exchange 104 receives a call from telecommunications network 105, where the call is originated by unaffiliated telecommunications terminal 102.

At task 202, private branch exchange 104 extends the call to a first telephone number. The first telephone number exists in the address space of the private branch exchange, namely address space 112, and can be associated with one of on-premises terminals 103-1 through 103-N. The first telephone number is represented as the private branch exchange extension in Table 1.

At task 203, private branch exchange 104 also extends the call to a second telephone number. The second telephone number exists in the address space of telecommunications network 105, namely address space 111, and can be associated with an affiliated, off-premises terminal such as affiliated telecommunications terminal 101-n.

Referring to the example in Table 1, the call, placed to 732-555-0102, extension 11 (i.e., shown in the first row), is connected to private branch exchange extension 11 and is also forwarded to telecommunications network number 201-555-1236.

SUMMARY OF THE INVENTION

The present invention provides a plurality of telecommunications management features to a telecommunications terminal that is associated with a corresponding terminal through a private branch exchange. In particular, the illustrative embodiment enables a user to manage the simultaneous use of and interaction between associated (i.e., coupled) telecommunications terminals. This capability can be particularly advantageous when on-premises telecommunications terminals are coupled with off-premises telecommunications terminals. For example, an employee who is away from the workplace might have calls to his or her on-premises terminal (e.g., an office desk phone, etc.) automatically extended to a coupled, off-premises terminal (e.g., the employee's cell phone, etc.). In such a scenario, when the employee is engaged in a call on his or her off-premises terminal and the call was extended from the corresponding on-premises terminal, the employee might want to prevent another person from using the on-premises terminal to join or eavesdrop on the call in progress. As another example, the employee might allow another person to join the call via the on-premises terminal, but might want to drop the person from the call at a particular point during the call (e.g., for privacy reasons, etc.).

The illustrative embodiment of the present invention provides such management of coupled telecommunications terminals via call-handling permissions that are associated with each on-premises/off-premises terminal pair. For example, a particular call-handling permission for a telecommunications terminal pair X/Y might indicate that, for a call to terminal X that is extended to terminal Y:

(i) terminal X is not permitted to join the call after it has been answered at terminal Y; or
(ii) terminal Y is not permitted to join the call after it has been answered at terminal X.

In the illustrative embodiment, call-handling permissions for an on-premises/off-premises telecommunications terminal pair X/Y are maintained in a table of the private branch exchange.

The illustrative embodiment comprises: setting a call-handling permission for one of (i) a first telecommunications terminal and (ii) a second telecommunications terminal, based on a signal received from the other one of (i) the first telecommunications terminal and (ii) the second telecommunications terminal; wherein the telephone number of the first telecommunications terminal exists within the address space of the Public Switched Telephone Network; and wherein the telephone number of the second telecommunications terminal exists within the address space of a private branch exchange telephone system; and wherein the telephone number of the first telecommunications terminal is coupled with the telephone number of the second telecommunications terminal.

DETAILED DESCRIPTION

The term that appears below is given the following definition for use in this Description and the appended Claims.

For the purposes of the specification and claims, the term "call appearance" is defined as a telephone line extending between a private branch exchange and a telecommunications terminal whose extension is served by the private branch exchange. There might be more than one call appearance that is associated with an extension.

Figure 3:
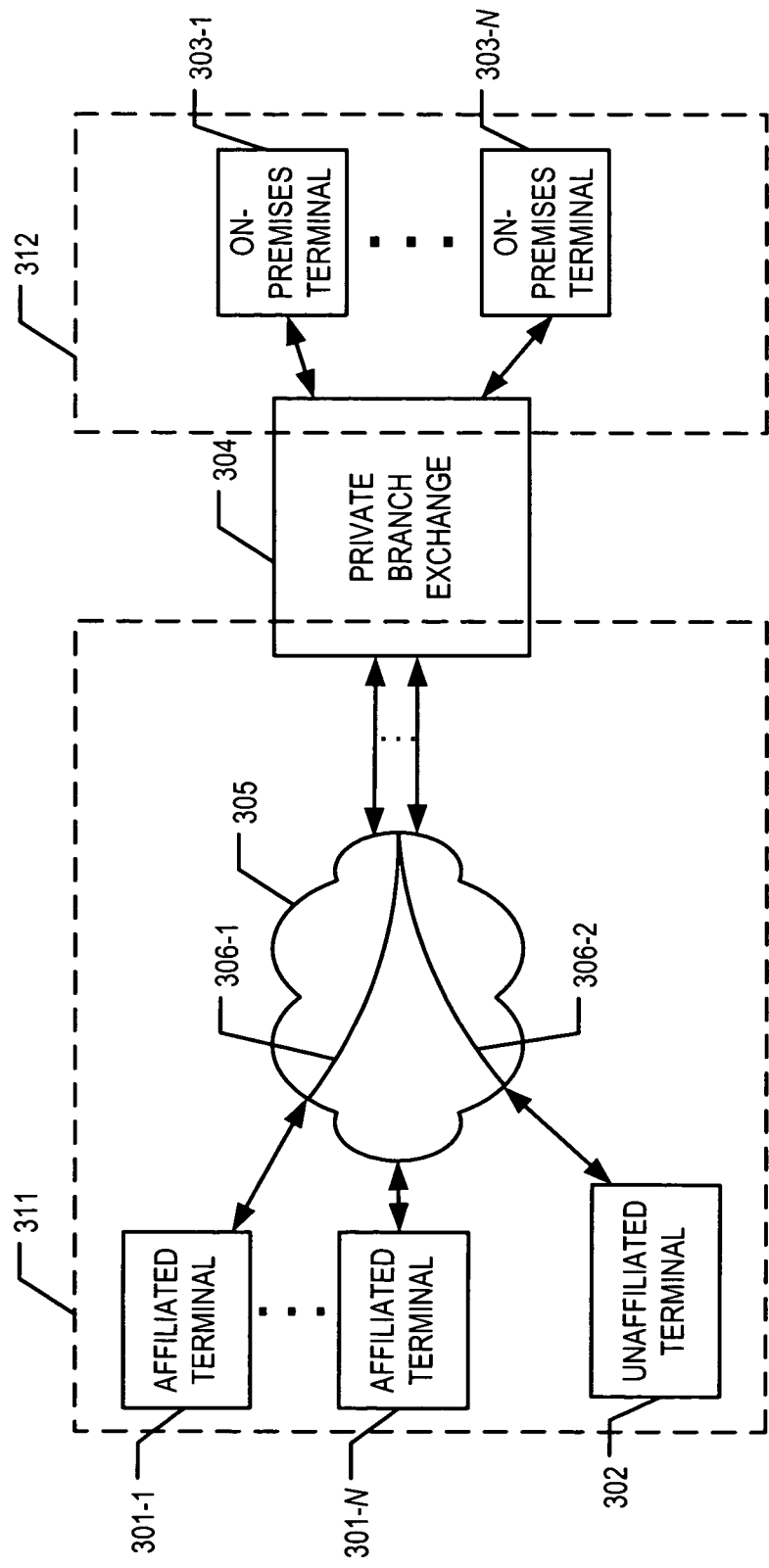
FIG. 3 depicts a schematic diagram of telecommunications system 300, in accordance with the illustrative embodiment of the present invention.

FIG. 3 depicts a schematic diagram of telecommunications system 300, in accordance with the illustrative embodiment of the present invention. Telecommunications system 300 comprises affiliated off-premises telecommunications terminals 301-1 through 301-N, wherein N is a positive integer, unaffiliated off-premises telecommunications terminal 302; on-premises telecommunications terminals 303-1 through 303-N; private branch exchange telephone system 304; and telecommunications network 305, interconnected as shown.

Affiliated telecommunications terminal 301-n, wherein n is a positive integer between 1 and N, inclusive, is an off-premises telecommunications terminal whose telephone number is coupled with an on-premises telephone number of private branch exchange 304. Affiliated telecommunications terminal 301-n is capable of transmitting, via telecommunications network 105, signaling information that can be used to control a call. For example, terminal 301-n can be a cellular terminal that is capable of transmitting the signaling information via a cellular network that constitutes network 105. As another example, terminal 301-n can be a type of telecommunications terminal other than a cell phone (e.g., wireline analog telephone, Integrated Services Digital Network [ISDN] terminal, Internet Protocol terminal, etc.) that is capable of transmitting the signaling information via one or more compatible networks that constitute network 105. Affiliated telecommunications terminal 301-n interoperates with the rest of telecommunications system 300 to exchange information with other telecommunications terminals (e.g., terminal 302, terminal 301-n, etc.), as part of a call.

It will be clear to those skilled in the art how make and use affiliated telecommunications terminal 301-n.

Unaffiliated telecommunications terminal 302 is a telecommunications terminal that is not affiliated with private branch exchange 304. Terminal 302 is a type of telecommunications terminal (e.g., wireline analog telephone, cellular terminal, Integrated Services Digital Network [ISDN] terminal, Internet Protocol terminal, etc.) that interoperates with the rest of telecommunications system 300 to exchange information with other telecommunications terminals (e.g., affiliated telecommunications terminal 301-n, on-premises telecommunications terminal 301-n, another unaffiliated terminal, etc.), as part of a call.

As will be appreciated by those skilled in the art, although only one unaffiliated terminal is depicted in FIG. 3, additional unaffiliated terminals can be present in telecommunications system 300. It will be clear to those skilled in the art how make and use unaffiliated telecommunications terminal 302.

On-premises telecommunications terminal 301-n, wherein n is a positive integer between 1 and N, inclusive, is a telecommunications terminal that is connected to private branch exchange 304 and whose telephone number is within the address space of private branch exchange 304. In accordance with the illustrative embodiment of the present invention, on-premises telecommunications terminal 301-n, is a deskset that is capable of transmitting, via private branch exchange 304, signaling information that can be used to control a call. Terminal 303-n interoperates with the rest of telecommunications system 300 to exchange information with other telecommunications terminals (e.g., affiliated telecommunications terminal 301-n, unaffiliated terminal 302, etc.), as part of a call.

It will be clear to those skilled in the art how make and use on-premises telecommunications terminal 303-n.

Private branch exchange 304 provides telecommunications services to its associated users within a premises (e.g., office complex, etc.). Private branch exchange 304 is connected via communications paths called "lines," to on-premises telecommunications terminals 303-1 through 303-N, as is well-known in the art. In addition, private branch exchange 304 is connected via one or more communications paths, such as "trunks" as are known in the art, to telecommunications network 305. Private branch exchange 304's structure is described later and with respect to FIG. 4.

Figure 1:
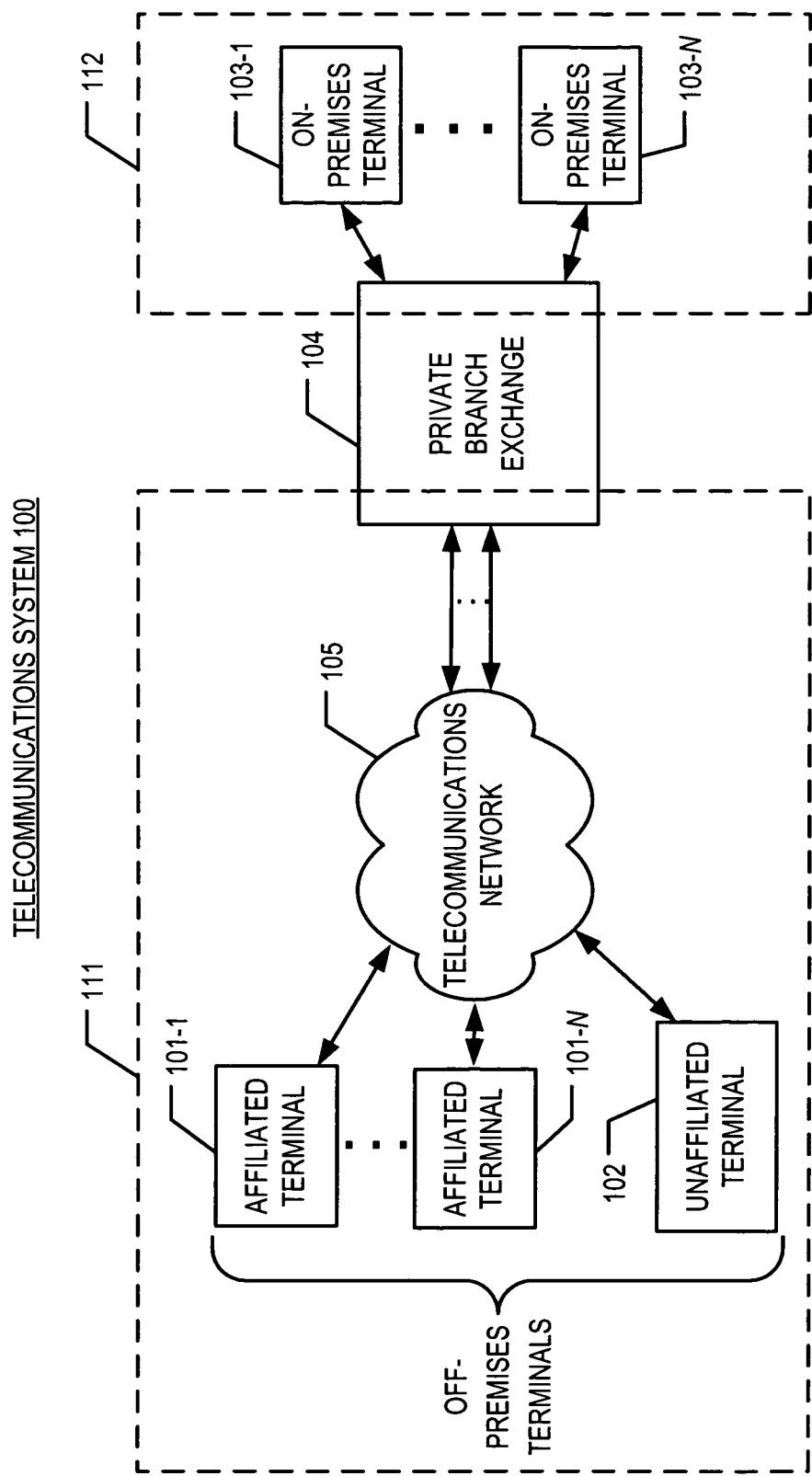
FIG. 1 depicts a schematic diagram of telecommunications system 100 in the prior art.
Figure 2:
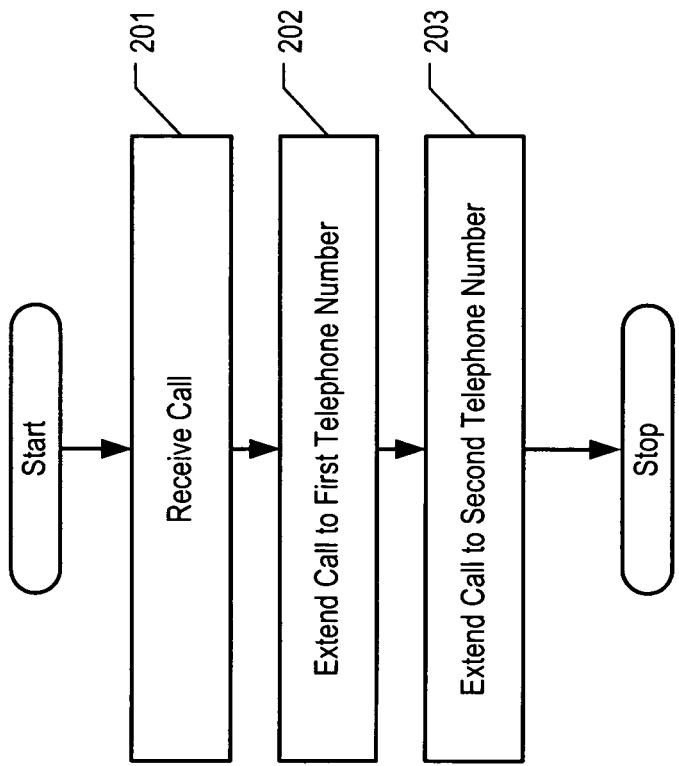
FIG. 2 depicts a flowchart of tasks relevant to processing an incoming call in the prior art.

Private branch exchange 304 provides telecommunications functions to off-premises telecommunications terminals 301 and on-premises terminals 303 consistent with the functionality described earlier and with respect to FIGS. 1 and 2. In addition, private branch exchange 304 provides functionality described below and with respect to FIGS. 9 through 18, in accordance with the illustrative embodiment of the present invention. It will be clear to those skilled in the art, after reading this specification, how to make and use private branch exchange 304.

Telecommunications network 305 provides one or more transmission paths between (i) terminal 301-n or 302, and (ii) private branch exchange 304, in well-known fashion. As is well-known in the art, network 305 typically comprises one or more networking elements such as switches, routers, hubs, etc. In some embodiments, network 305 comprises the Public Switched Telephone Network (PSTN). In some other embodiments, network 305 comprises one or more packet-switched networks. It will be clear to those skilled in the art how to make and use telecommunications network 305.

The address spaces that are relevant to telecommunications network 300 are also depicted in FIG. 3. The term "address space" refers to an addressable region of telephone service, as described earlier and with respect to FIG. 1. Address space 311 represents the addressable region of telecommunications network 305 (e.g., the Public Switched Telephone Network, etc.). Address space 312 represents the addressable region of private branch exchange 304.

Also depicted in FIG. 3 is an example of the routing of a call from affiliated telecommunications terminal 301-1 to unaffiliated terminal 302 via private branch exchange 304, in accordance with the illustrative embodiment of the present invention. The user of terminal 301-1 dials a telephone number that is associated with private branch exchange 304, in well-known fashion. Elements in network 305 set up the first leg of the call on call path 306-1. Private branch exchange 304 detects the incoming call and, in accordance with the illustrative embodiment of the present invention, determines that the dialed telephone number actually corresponds to a feature for selecting an idle call appearance, instead of corresponding to a telecommunications terminal. As a result, private branch exchange 304 provides dial tone to terminal 301-1's user, who then dials the telephone number of terminal 302. Elements in network 305 set up the second leg of the call on call path 306-2 to terminal 302. In accordance with the illustrative embodiment of the present invention, private branch exchange 304 provides, as calling party information to terminal 302, an on-premises telephone number with which terminal 301-1 is associated.

Figure 4:
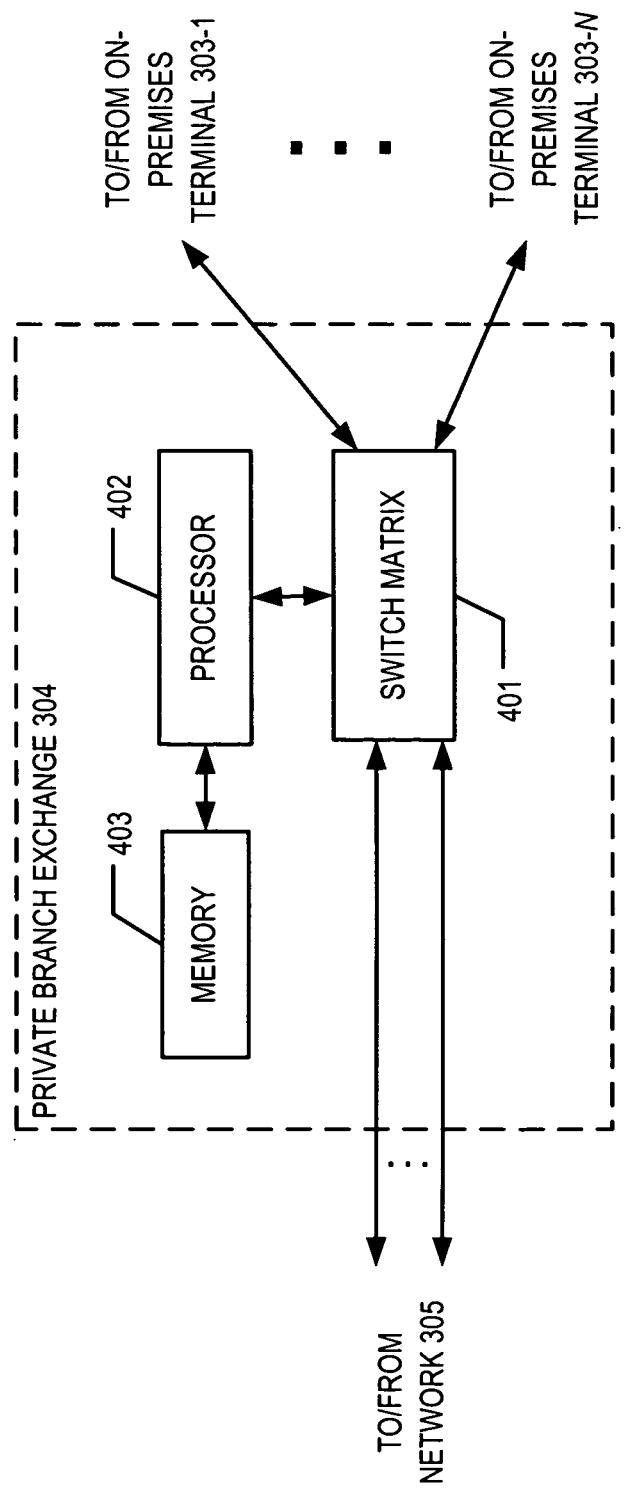
FIG. 4 depicts a schematic diagram of private branch exchange 304, as shown in FIG. 3, in accordance with the illustrative embodiment of the present invention.

FIG. 4 depicts private branch exchange 304, in accordance with the illustrative embodiment of the present invention. Private branch exchange 304 comprises switch matrix 401, processor 402, and memory 403, interconnected as shown.

Switch matrix 401 is a circuit that receives signals that convey call-related data and traffic from telecommunications network 305, forwards the call-related data to processor 402, extends the traffic to on-premises telecommunications terminals 303-1 through 303-N, extends the traffic to off-premises telecommunications terminals 301-1 through 301-N, and redirects the traffic to telecommunications network 305. Switch matrix 401 also receives signals that convey call-related data and traffic from on-premises telecommunications terminals 303-1 through 303-N, forwards the call-related data to processor 402, and forwards the traffic to telecommunications network 305. Switch matrix also receives commands from processor 402. It will be clear to those skilled in the art how to make and use switch matrix 401.

Processor 402 is a general-purpose processor that is capable of receiving call-related data from switch matrix 401, of executing instructions stored in memory 403, of reading data from and writing data into memory 403, of executing the tasks described below and with respect to FIGS. 9 through 18, and of transmitting commands to switch matrix 401. In some alternative embodiments of the present invention, processor 402 might be a special-purpose processor. In either case, it will be clear to those skilled in the art, after reading this specification, how to make and use processor 402.

Memory 403 stores data and executable instructions, as is well-known in the art, and might be any combination of random-access memory (RAM), flash memory, disk drive memory, etc. It will be clear to those skilled in the art how to make and use memory 403.

Figure 5:
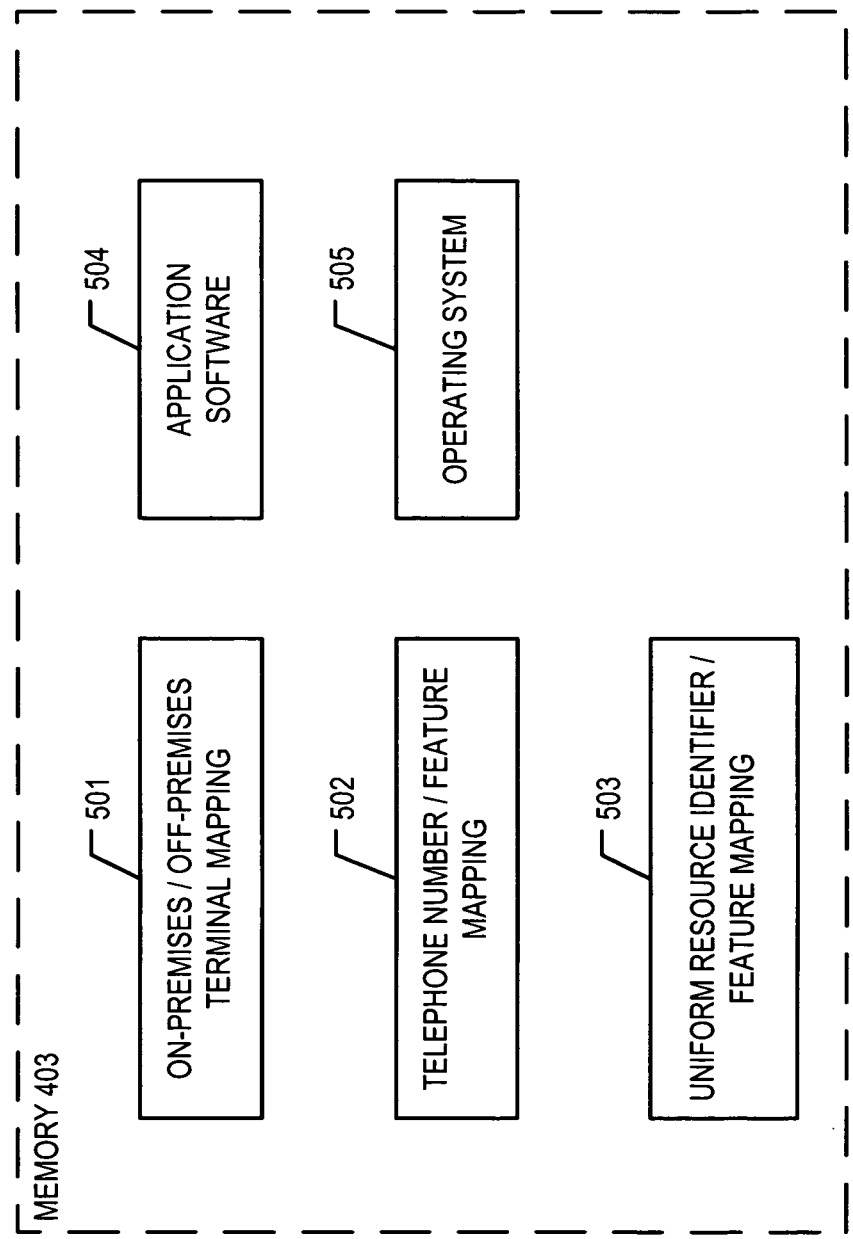
FIG. 5 depicts a block diagram of how user information is stored and organized in memory 403 of private branch exchange 304, in accordance with the illustrative embodiment of the present invention.

FIG. 5 depicts a map of the salient contents of memory 403, which comprises on-premises/off-premises terminal mapping 501, telephone number/feature mapping 502, uniform resource identifier/feature mapping 503, application software 504, and operating system 505. As will be appreciated by those skilled in the art, the information that is stored in memory 403 can be organized differently than what is depicted in FIG. 5.

Mapping 501 comprises one or more records of data, wherein each record describes a coupling of an off-premises telephone number (or other identifier) for terminal 301-n with an on-premises telephone number (or other identifier) for terminal 301-n, for n=1 through N, in accordance with the illustrative embodiment of the present invention. Private branch exchange 304 uses mapping 501 to determine which off-premises telephone number is associated with which on-premises telephone number for the purposes of (i) extending incoming calls to off-premises terminals and (ii) identifying one or more telecommunications terminals for which to activate or deactivate a feature. The content of mapping 501 is described in detail below and with respect to FIG. 6.

Mappings 502 and 503 also comprise records of data. Mapping 502 comprises one or more records of data, wherein each record describes an association of a telephone number with a telecommunications feature, in accordance with the illustrative embodiment of the present invention. Mapping 503 comprises one or more records of data, wherein each record describes an association of a uniform resource identifier (URI) with a telecommunications feature, in accordance with the illustrative embodiment of the present invention. The content of mappings 502 and 503 is described below and with respect to FIGS. 7 and 8, respectively.

In accordance with the illustrative embodiment of the present invention, private branch exchange 304 looks up a telephone number stored in mappings 502 or a uniform resource identifier stored in mapping 503 in order to determine a corresponding telecommunications features. As those who are skilled in the art will appreciate, private branch exchange 304 might only have to store records for a single type of identifier (i.e., telephone number or uniform resource identifier, but not both) if the features are identified solely by the single type of identifier.

Application software 504 is the software portion of the editing system described below and with respect to FIGS. 6 through 18. Operating system 505 is an operating system, in well-known fashion, that performs input/output, file and memory management, and all of the other functions normally associated with operating systems. It will be clear to those skilled in the art how to make and use operating system 505.

Figure 6:
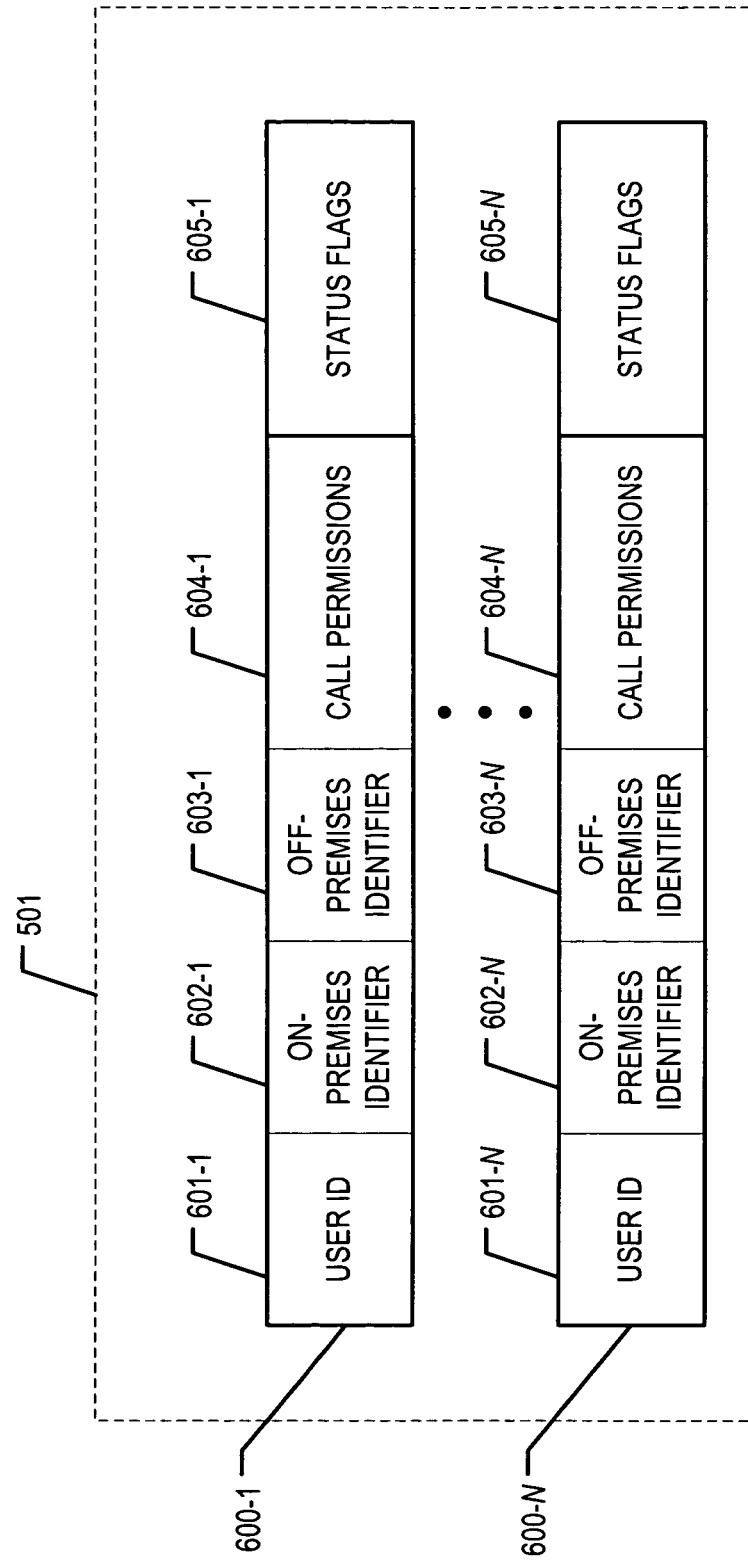
FIG. 6 depicts a block diagram of how information is stored and organized in mapping 501 of memory 403, in accordance with the illustrative embodiment of the present invention.

FIG. 6 depicts the contents of mapping 501 that comprises user records 600-1 through 600-N. User record 600-n, wherein n is between 1 and N, inclusive, comprises fields 601-n, 602-n, 603-n, 604-n, and 605-n.

Field 601-n stores data that identifies user $U_n$ who is associated with private branch exchange 304. $U_n$ is also associated with terminals that are served by private branch exchange 304, including affiliated telecommunications terminal 301-n and on-premises telecommunications terminal 303-n. $U_n$ can be identified by name, employee ID, or some other unique identifier, in well-known fashion.

Field 602-n stores an off-premises identifier that identifies affiliated telecommunications terminal 301-n. For some affiliated telecommunications terminals 301, the off-premises identifier is a telephone number (e.g., "732-555-0689", etc.). For some other affiliated telecommunications terminals 301, the off-premises identifier can be a media endpoint address (e.g., "sip1111@example.com", etc.). As those who are skilled in the art will appreciate, other types and formats of identifiers can be used to identify affiliated telecommunications terminal 301-n.

Field 603-n stores an on-premises telephone number (e.g., "732-555-0102, x12", etc.) that identifies on-premises telecommunications terminal 303-n. As those who are skilled in the art will appreciate, other types and formats of identifiers can be used to identify on-premises telecommunications terminal 303-n.

The identifiers in fields 602-n and 603-n for a given user $U_n$ are said to be coupled with each other. By coupling, for example, on-premises and off-premises telephone numbers in this fashion, private branch exchange 304 provides the user with the capability to have one administered station that supports features for both a desk set (i.e., on-premises telecommunications terminal 303-n) and an off-premises terminal (i.e., affiliated telecommunications terminal 301-n). For example, if user $U_n$ is currently on a call and using the off-premises terminal, $U_n$ can transfer the call to another party via the off-premises terminal.

Field 604-n tores one or more call permissions that are currently in effect for the on-premises/off-premises terminal pair represented in user record 600-n. The information in field 604-n indicates (i) which telecommunications features terminals 301-n and 303-n are permitted to access; (ii) whether terminals 301-n and 303-n are permitted to participate in or control current and future calls; and (iii) whether terminal 301-n is permitted to access a call appearance of terminal 303-n. For example, a call permission of field 604-n might exclude $U_n$'s on-premises terminal from joining an in-progress call that was extended by private branch exchange 304 to $U_n$'s off-premises terminal.

Field 605-n stores one or more status flags for the on-premises/off-premises terminal pair represented in user record 600-n. Each flag tracks the current status of a feature (or pair of related features) that is either "on" or "off." Features of this nature are referred to in the specification as "Boolean status features." An example of an "on/off" feature pair is "Off-PBX Call Enable/Disable," in which the corresponding status flag in field 605-n indicates that calls are either extendable or not extendable to affiliated telecommunications terminal 301-n.

Figure 7:
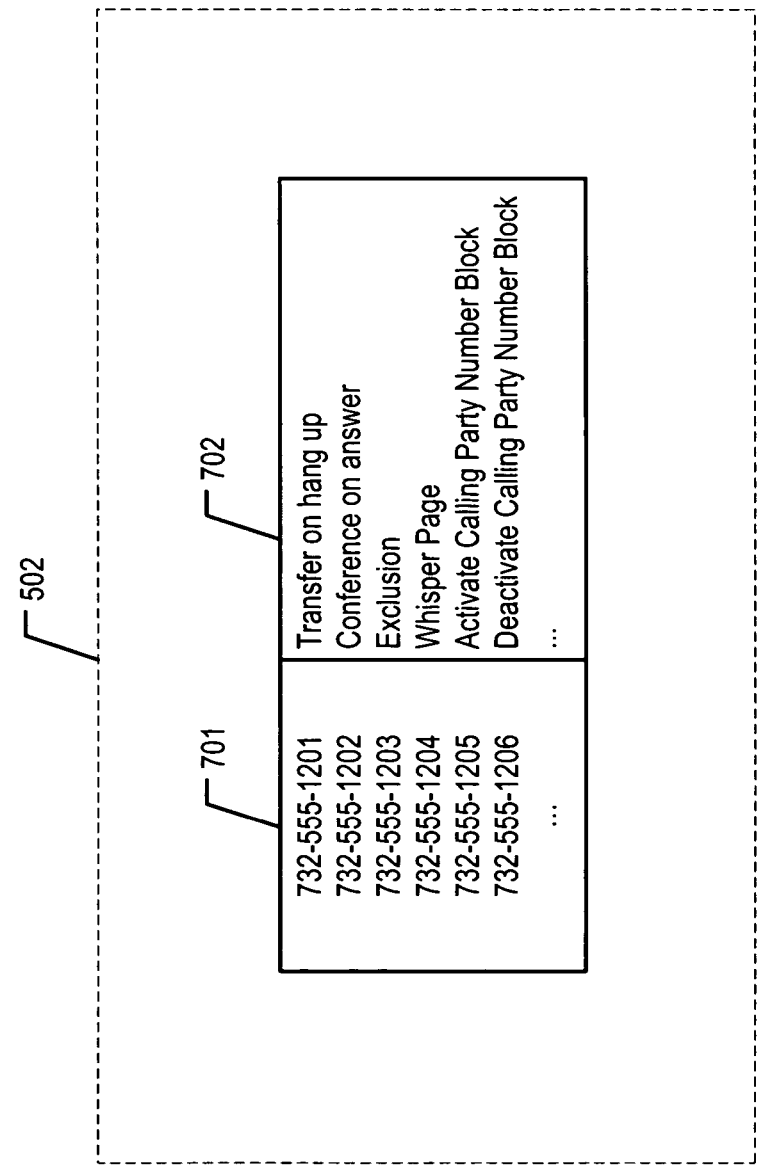
FIG. 7 depicts a block diagram of how information is stored and organized in mapping 502 of memory 403, in accordance with the illustrative embodiment of the present invention.

FIG. 7 depicts the contents of mapping 502, which comprises feature name extension list 701 and feature identifier list 702. Feature name extension list 701, in turn, comprises feature name extension 701-p, for p=1 through P, where P is a positive integer. Feature identifier list 702, similarly, comprises feature identifier 702-p, for p=1 through P.

Feature name extension 701-p is a telephone number in the address space of the Public Switched Telephone Network that represents a particular feature. User $U_n$ of affiliated telecommunications terminal 301-n can enter (i.e., "dial") feature name extension 701-p to invoke a feature from his or her off-premises terminal. From the vantage point of the Public Switched Telephone Network, feature name extension 701-p appears to be a (normal) telephone number and, as such, is used by the equipment in telecommunications network 305 to route the "call" to private branch exchange 304.

Feature identifier 702-p identifies the feature that corresponds to feature name extension 701-p. When private branch exchange 304 receives what it recognizes to be a feature name extension, private branch exchange 304 uses identifier 702-p to determine the feature that corresponds to the received feature name extension. Private branch exchange 304 can then invoke the corresponding feature in well-known fashion.

Each feature name extension 701-p is associated with a corresponding feature identifier 702-p. For example, as depicted in FIG. 7, if private branch exchange 304 receives the feature name extension "732-555-1202," it determines from the contents of mapping 502 that the "Conference on answer" feature should be invoked.

The tasks that are associated with determining and invoking a particular feature that corresponds to a received feature name extension are described below and with respect to FIG. 9.

Figure 8:
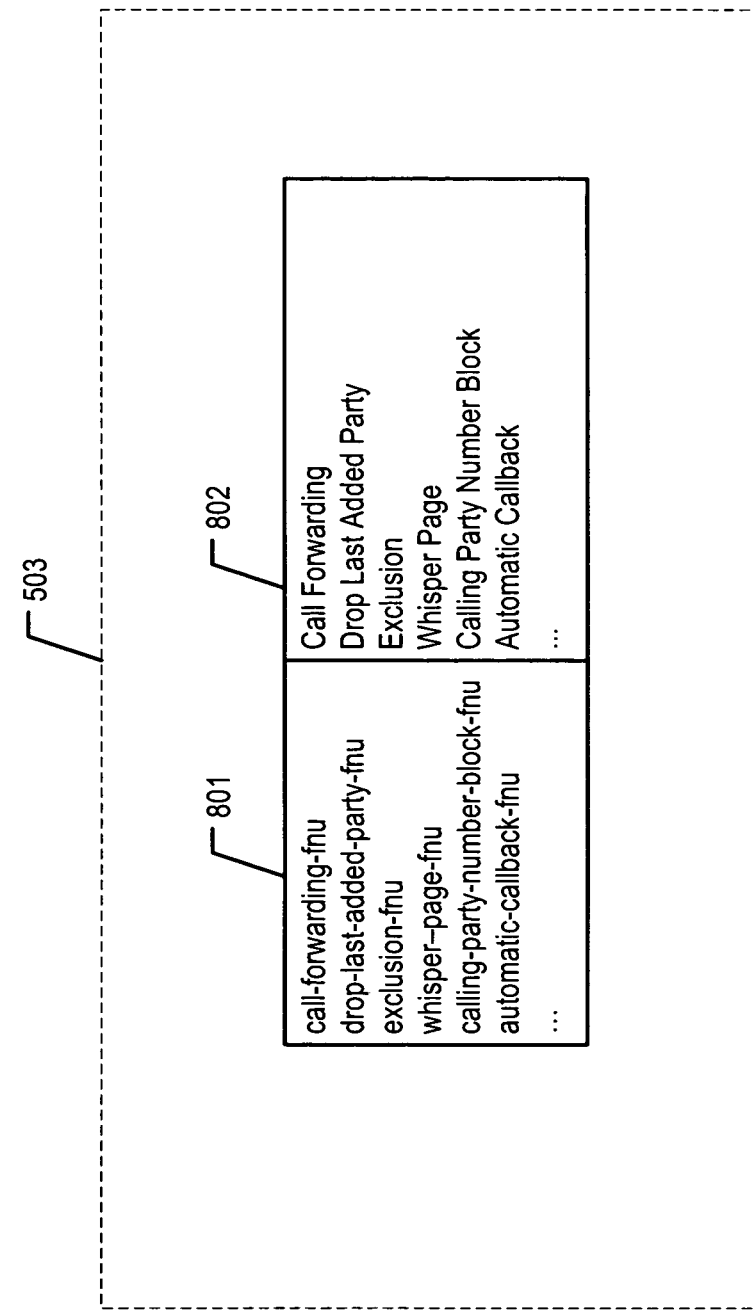
FIG. 8 depicts a block diagram of how information is stored and organized in mapping 503 of memory 403, in accordance with the illustrative embodiment of the present invention.

FIG. 8 depicts the contents of mapping 503 that comprises list 801 of uniform resource identifier (URI) substring, and feature identifier list 802. List 801, in turn, comprises URI substring 801-q, for q=1 through Q. The parameter Q is a positive integer that equals the number of features that are accessed via uniform resource identifiers. Feature identifier list 802, in turn, comprises feature identifier 802-q, for q=1 through Q.

URI substring 801-q is a string of symbols that corresponds to a particular feature. As will be appreciated by those skilled in the art, in some embodiments the URI substring might be the endpoint address of the URI, while in some other embodiments the URI substring might be a parameter/value pairing of the URI, or some other portion of the URI. A SIP-capable terminal invokes a telecommunications feature by transmitting to private branch exchange 304 (or a proxy that operates on behalf of exchange 304), via telecommunications network 305, a session-initiation request with a URI that contains the substring corresponding to the feature.

Feature identifier 802-q identifies the feature that corresponds to feature URI substring 801-q. When private branch exchange 304 receives a URI with a recognizable URI substring, private branch exchange 304 determines the telecommunications feature that corresponds to the substring and invokes the feature, in well-known fashion.

Each feature name URI 801-q is associated with a corresponding feature identifier 802-q. For example, as depicted in FIG. 8, if private branch exchange 304 receives a URI with "exclusion-fnu" in the appropriate URI substring, private branch exchange 304 determines from mapping 503 that the corresponding telecommunications feature is "Exclusion" and invokes this feature.

The tasks associated with determining and invoking a particular feature when a session-initiation request is received at private branch exchange 304 are described below and with respect to FIG. 10.

Figure 9:
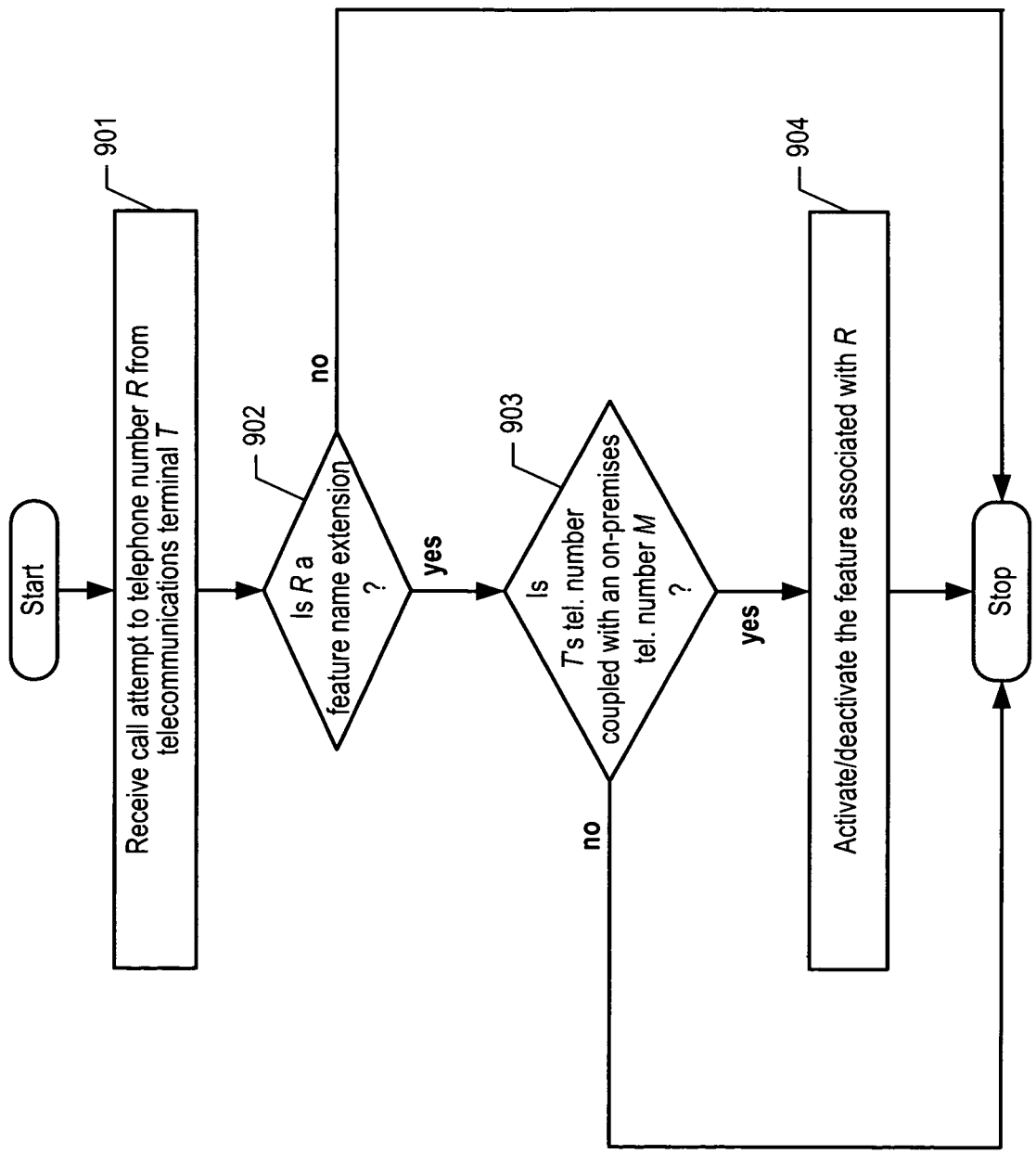
FIG. 9 depicts a flowchart of the salient tasks associated with activating a telecommunications feature via a feature name extension, in accordance with the illustrative embodiment of the present invention.

FIG. 9 depicts a flowchart of the salient tasks associated with activating a telecommunications feature via a feature name extension, in accordance with the illustrative embodiment of the present invention. It will be clear to those skilled in the art which tasks depicted in FIG. 9 can be performed simultaneously or in a different order than that depicted.

At task 901, private branch exchange 304 receives a call attempt to a telephone number R from a telecommunications terminal T, in well-known fashion. In some embodiments, terminal T is an off-premises telecommunications terminal, while in other embodiments terminal T can be an on-premises telecommunications terminal. Terminal T's telephone number is received as part of the call attempt (e.g., in a calling party number message field, etc.).

At task 902, private branch exchange 304 checks whether telephone number R is a feature name extension in mapping 502 of memory 403. If R is a feature name extension, execution continues at task 904, otherwise the method of FIG. 9 terminates.

At task 903, private branch exchange 304 checks whether telecommunications terminal T's telephone number is coupled with an on-premises telephone number in mapping 501 of memory 403. If this is the case, execution continues at task 904, otherwise the method of FIG. 9 terminates.

At task 904, private branch exchange 304 activates (or deactivates, as appropriate) the feature that corresponds to telephone number R. As will be appreciated by those skilled in the art, a telecommunications feature could apply to:
 i. terminal T only;
 ii. a current call that involves terminal T;
 iii. a future call that is directed to terminal T;
 iv. a future call that is placed by terminal T;
 v. terminal T's counterpart terminal (i.e., the on-premises terminal that corresponds to terminal T when T is an off-premises terminal, and vice versa);
 vi. a current call that involves terminal T's counterpart terminal;
 vii. a future call that is directed to terminal T's counterpart terminal;
 viii. a future call that is placed by terminal T's counterpart terminal;
 ix. all on-premises terminals; or
 x. all affiliated off-premises terminals.

Figure 10:
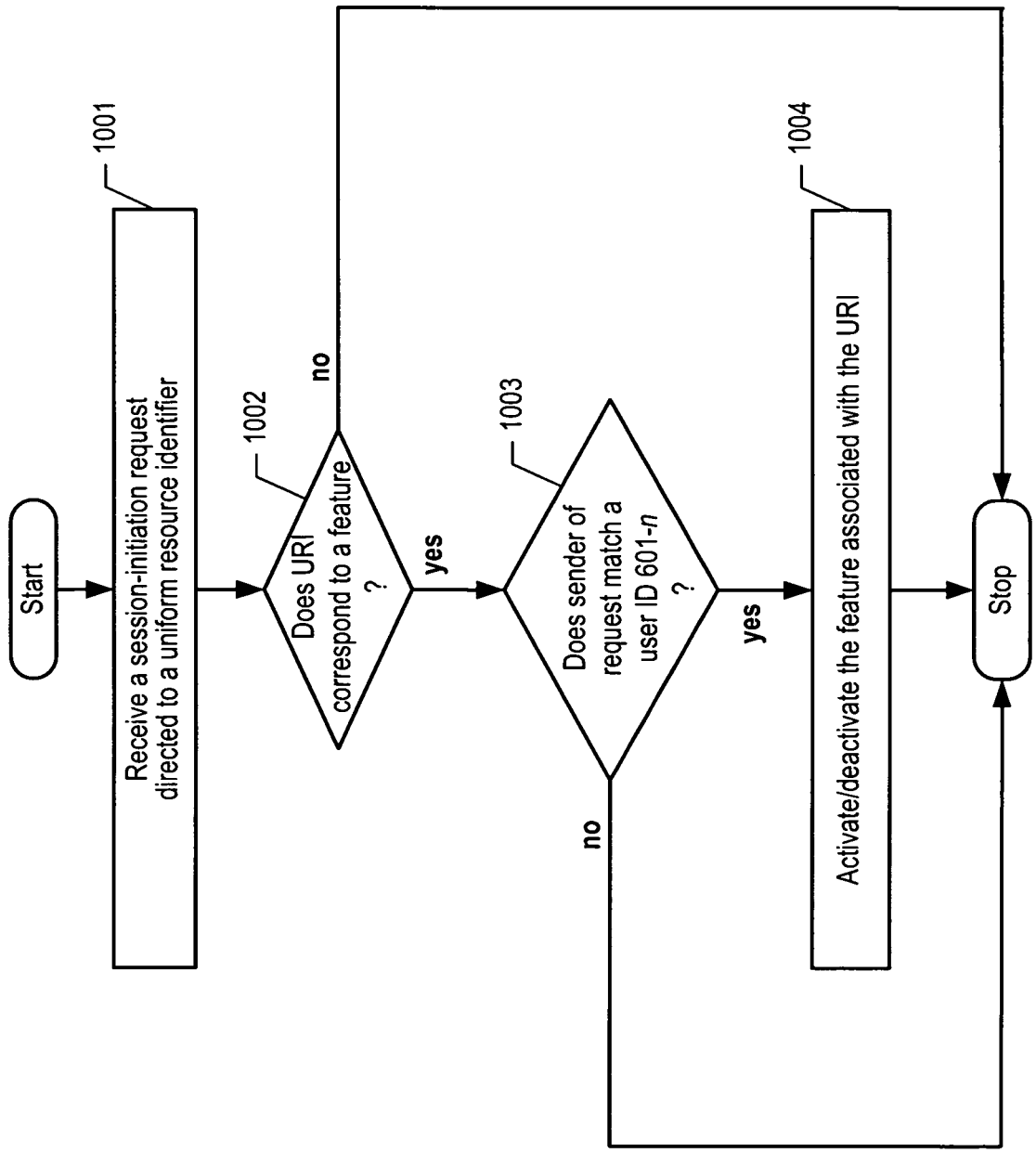
FIG. 10 depicts a flowchart of the salient tasks associated with activating a telecommunications feature via a feature name uniform resource identifier, in accordance with the illustrative embodiment of the present invention.

FIG. 10 depicts a flowchart of the salient tasks associated with activating a telecommunications feature via a feature name uniform resource identifier, in accordance with the illustrative embodiment of the present invention. It will be clear to those skilled in the art which tasks depicted in FIG. 10 can be performed simultaneously or in a different order than that depicted.

At task 1001, private branch exchange 304 receives a session-initiation request (e.g., as part of a SIP "INVITE" message, etc.) that specifies a uniform resource identifier (URI) that comprises a telecommunications feature to invoke, an endpoint address, etc. The sender of the request is the endpoint to which the feature will apply, in accordance with the illustrative embodiment of the present invention. As those who are skilled in the art will appreciate, however, the endpoint sending the request might be different than the endpoint to which the feature will apply. Furthermore, the sender of the request is an off-premises telecommunications terminal, in accordance with the illustrative embodiment. As those who are skilled in the art will appreciate, however, the sender can be an on-premises telecommunications terminal.

At task 1002, private branch exchange 304 checks whether the feature that is specified in the received URI corresponds to a telecommunications feature in mapping 503 of memory 403. If so, execution continues at task 1003, otherwise the method of FIG. 10 terminates.

At task 1003, in some embodiments, private branch exchange 304 checks whether the sender of the session-initiation request matches an identifier in one of the user ID fields 601 in mapping 501 of memory 403. If so, execution continues at task 1004, otherwise the method of FIG. 10 terminates.

At task 1004, private branch exchange 304 activates (or deactivates, as appropriate) the telecommunications feature that was determined at task 1002. As will be appreciated by those skilled in the art, some telecommunications features might apply to the user $U_n$ (identified in field 601-n) who sent the session-initiation request, while some other telecommunications features might apply just to one of the on-premises and off-premises telephone numbers that correspond to user $U_n$, or might even be "global" in nature and apply to all telephone numbers within the address space of private branch exchange 304. After task 1004, the method of FIG. 10 terminates.

For the remainder of the disclosure, which comprises flowcharts for private branch exchange 304, the illustrative embodiment is described with respect to feature name extensions. It will be clear to those skilled in the art, after reading this specification, how to extend these flowcharts to handle feature name uniform resource identifiers in addition to feature name extensions, and how to make and use the illustrative embodiment based on the extended flowcharts.

Figure 11:
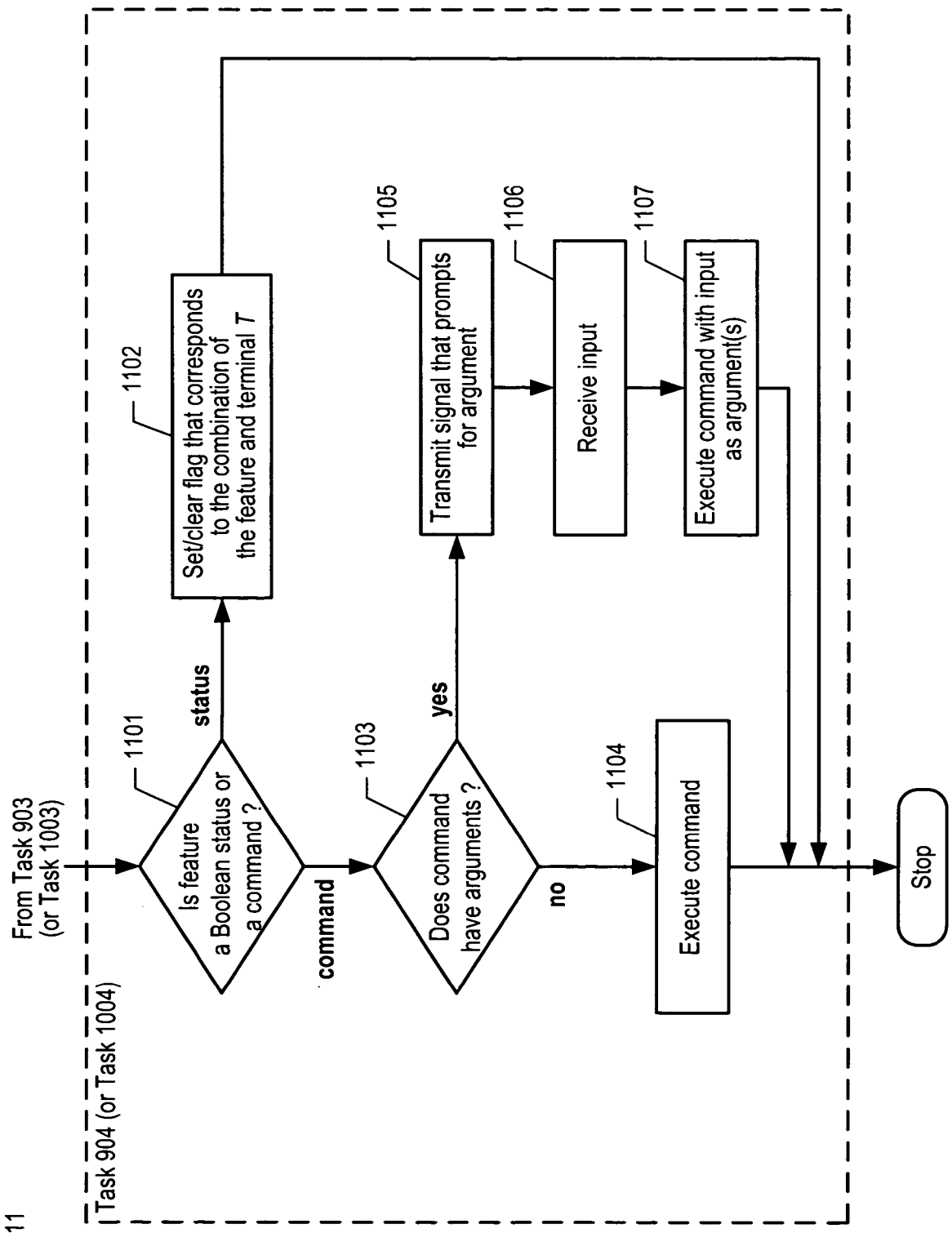
FIG. 11 depicts a detailed flowchart for task 904, as depicted in FIG. 9, in accordance with the illustrative embodiment of the present invention.

FIG. 11 depicts a detailed flowchart for task 904 (or task 1004), in accordance with the illustrative embodiment of the present invention. It will be clear to those skilled in the art which tasks depicted in FIG. 11 can be performed simultaneously or in a different order than that depicted.

At task 1101, private branch exchange 304 checks whether the feature that corresponds to telephone number R (or the URI of the session-initiation request) is a Boolean status feature (e.g., Calling party number block on/off, etc.) or a command (e.g., Drop last added party, etc.). If the feature is a command, execution continues at task 1103, otherwise execution continues at task 1102.

At task 1102, private branch exchange 304 sets or clears, as appropriate, the flag that corresponds to the combination of the feature and telecommunications terminal T (i.e., the flag in field 605-n that uniquely corresponds to the feature, such that terminal T's telephone number corresponds to the identifier in field 603-n). After task 1102, task 904 is completed and the method of FIG. 9 terminates.

At task 1103, private branch exchange 304 checks whether the command in question has one or more arguments (e.g., a transfer to another telephone number, etc.) or no arguments (e.g., drop last added party, etc.). If there are no arguments, execution continues at task 1104, otherwise execution continues at task 1105.

In some alternative embodiments, one or more of the command arguments are provided as part of received message that specifies the telecommunications feature. For example, a session-initiation request message can provide the extra digits that some features require (e.g., a forward-to number required for call-forwarding activation, etc.).

At task 1104, private branch exchange 304 executes the command, in well-known fashion. After task 1104, task 904 is completed and the method of FIG. 9 terminates.

At task 1105, private branch exchange 304 transmits to telecommunications terminal T a signal (e.g., a dial tone, an audio message, etc.) that indicates that private branch exchange 304 is ready to receive input from telecommunications terminal T (i.e., the argument(s) to the command).

At task 1106, private branch exchange 304 receives input from telecommunications terminal T, in well-known fashion.

At task 1107, private branch exchange 304 executes the command with the input received at task 1106 as argument(s) to the command, in well-known fashion. After task 1107, task 904 is completed and the method of FIG. 9 terminates.

Figure 12:
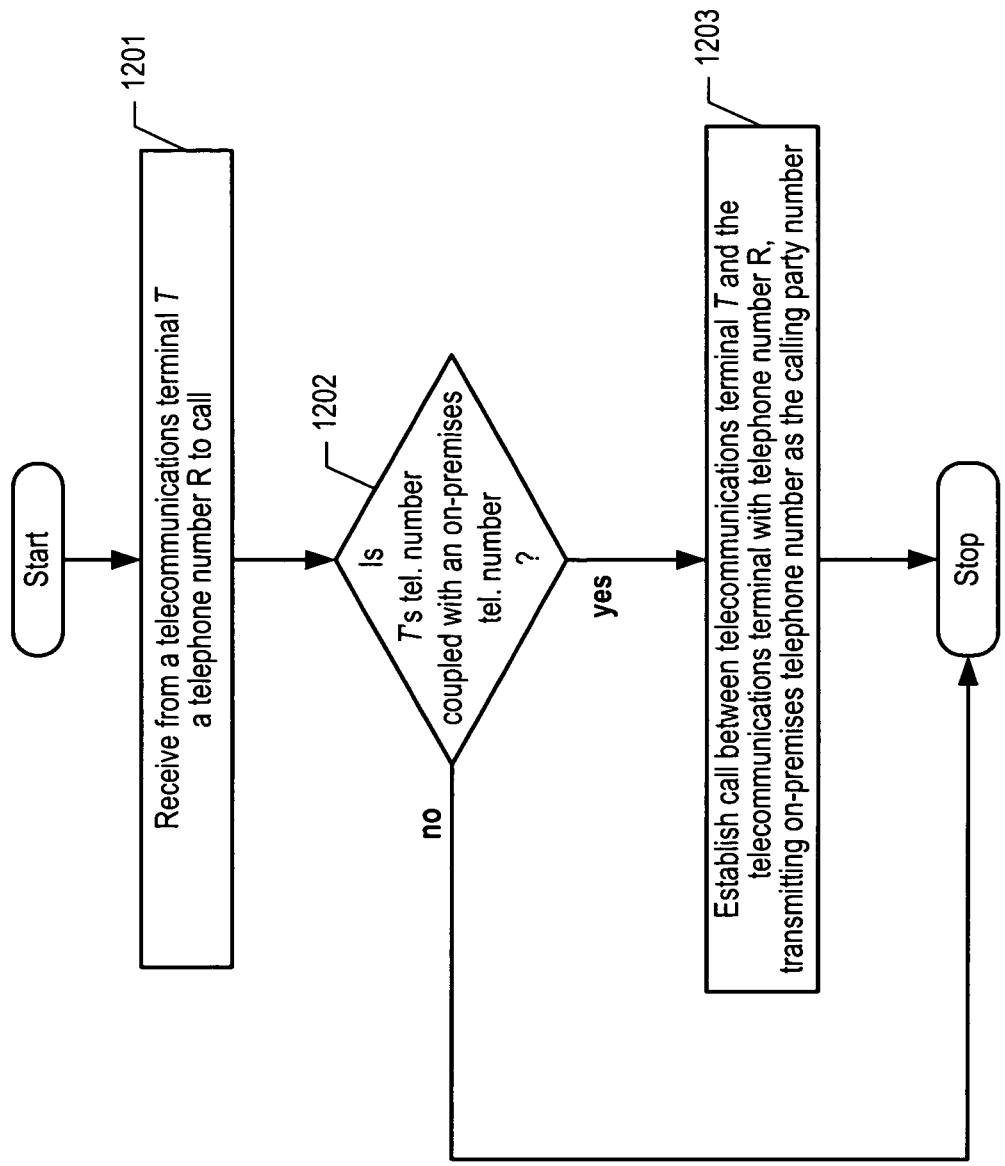
FIG. 12 depicts a flowchart of the salient tasks associated with an off-premises telecommunications terminal making a call in a spoofed manner, in accordance with the illustrative embodiment of the present invention.

FIG. 12 depicts a flowchart of the salient tasks associated with a telecommunications terminal making a call in which the calling party number (or identifier) is spoofed, in accordance with the illustrative embodiment of the present invention. It will be clear to those skilled in the art which tasks depicted in FIG. 12 can be performed simultaneously or in a different order than that depicted.

At task 1201, private branch exchange 304 receives a telephone number R to call from an off-premises telecommunications terminal T. In accordance with the illustrative embodiment, private branch exchange 304 receives telephone number R in accordance with FIGS. 9 and 11: off-premises telecommunications terminal T calls the feature name extension that corresponds to the feature for making a call through private branch exchange 304 (i.e., "Select idle call appearance"); private branch exchange 304 transmits a confirmation signal to terminal T; and terminal T transmits telephone number R to private branch exchange 304, indicating that R is the telephone number that terminal T wishes to call. As will be appreciated by those skilled in the art, in some other embodiments private branch exchange 304 might receive telephone number R from terminal T by a method that does not involve calling a feature name extension (e.g., through a menu of an interactive voice response system, etc.), and it will be clear to those of ordinary skill in the art how to make and use such embodiments after reading this specification.

At task 1202, private branch exchange 304 checks whether off-premises telecommunications terminal T's telephone number is coupled with an on-premises telephone number in mapping 501 of memory 403. If this is the case, execution continues at task 1203, otherwise the method of FIG. 12 terminates.

At task 1203, private branch exchange 304 establishes a call between off-premises telecommunications terminal T and the telecommunications terminal V with telephone number R, in well-known fashion. In establishing the call, private branch exchange 304 transmits the on-premises telephone number identified at task 1202 as the calling party number. As will be appreciated by those skilled in the art, in some alternative embodiments another on-premises telephone number (e.g., a "main office number" associated with private branch exchange 304, etc.) might be transmitted as the calling party number and provide the desired spoofing. After task 1203, the method of FIG. 12 terminates.

Figure 13:
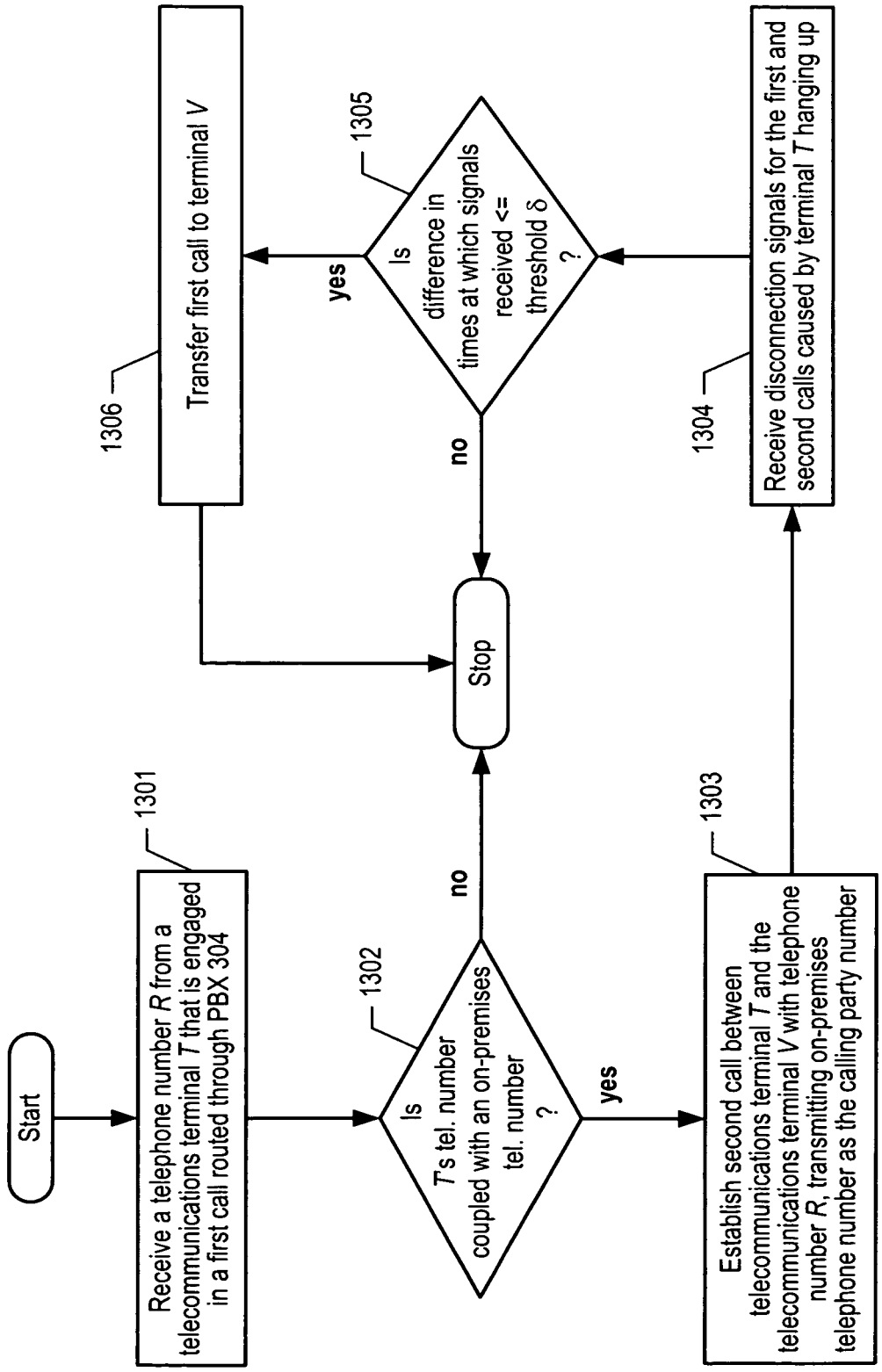
FIG. 13 depicts a flowchart of the salient tasks associated with a spoofed "transfer on hangup" initiated by an off-premises telecommunications terminal, in accordance with the illustrative embodiment of the present invention.

FIG. 13 depicts a flowchart of the salient tasks associated with a spoofed "transfer on hangup" initiated by an off-premises telecommunications terminal, in accordance with the illustrative embodiment of the present invention. A "transfer on hangup" enables the user of a first telecommunications terminal to transfer an existing call to a second telecommunications terminal by calling the second terminal and then hanging up. In a spoofed transfer on hangup, the calling party number of the call to the second terminal is a spoofed telephone number instead of the telephone number of the first terminal. It will be clear to those skilled in the art which tasks depicted in FIG. 13 can be performed simultaneously or in a different order than that depicted.

At task 1301, private branch exchange 304 receives a telephone number R from an off-premises telecommunications terminal T that is engaged in a first call made through private branch exchange 304. A second telecommunications terminal, which is possibly another off-premises telecommunications terminal, is also engaged in the call. In accordance with the illustrative embodiment, private branch exchange 304 receives telephone number R in accordance with FIGS. 9 and 11: off-premises telecommunications terminal T calls a feature name extension that corresponds to transferring a call; private branch exchange 304 transmits a confirmation signal to terminal T; and terminal T transmits telephone number R to private branch exchange 304, indicating that R is the telephone number that terminal T wishes to transfer the first call to. As will be appreciated by those skilled in the art, in some other embodiments private branch exchange 304 might receive telephone number R from terminal T by a method that does not involve calling a feature name extension (e.g., through a menu of an interactive voice response system, etc.), and it will be clear to those of ordinary skill in the art how to make and use such embodiments after reading this specification.

At task 1302, private branch exchange 304 checks whether off-premises telecommunications terminal T's telephone number is coupled with an on-premises telephone number in mapping 501 of memory 403. If this is the case, execution continues at task 1303, otherwise the method of FIG. 13 terminates.

At task 1303, private branch exchange 304 establishes a second call between off-premises telecommunications terminal T and the telecommunications terminal V with telephone number R, in well-known fashion. In establishing the second call, private branch exchange 304 transmits the on-premises telephone number identified at task 1302 as the calling party number. As will be appreciated by those skilled in the art, in some other embodiments of the present invention another on-premises telephone number (e.g., a "main office number" associated with private branch exchange 304, etc.) might be transmitted as the calling party number and provide desired spoofing.

At task 1304, private branch exchange 304 receives a first disconnection signal that indicates that the first call has been disconnected (e.g., as a result of off-premises telecommunications terminal T "hanging up", etc.), and a second disconnection signal that indicates that the second call has been disconnected (e.g., as a result of off-premises telecommunications terminal T hanging up, etc.).

At task 1305, private branch exchange 304 checks whether the difference in times at which it receives the first and second disconnection signals is less than or equal to a threshold 6 (e.g., one second, etc.). If this is the case, execution proceeds to task 1306, otherwise, the method of FIG. 13 terminates. Task 1305 is based on a heuristic that it is typically reasonable to conclude that the two disconnection signals were generated as a result of terminal T hanging up when the two disconnection signals are received at times that are relatively close to each other.

At task 1306, private branch exchange 304 transfers the first call to telecommunications terminal V, in well-known fashion. After task 1305, the method of FIG. 13 terminates.

Figure 14:
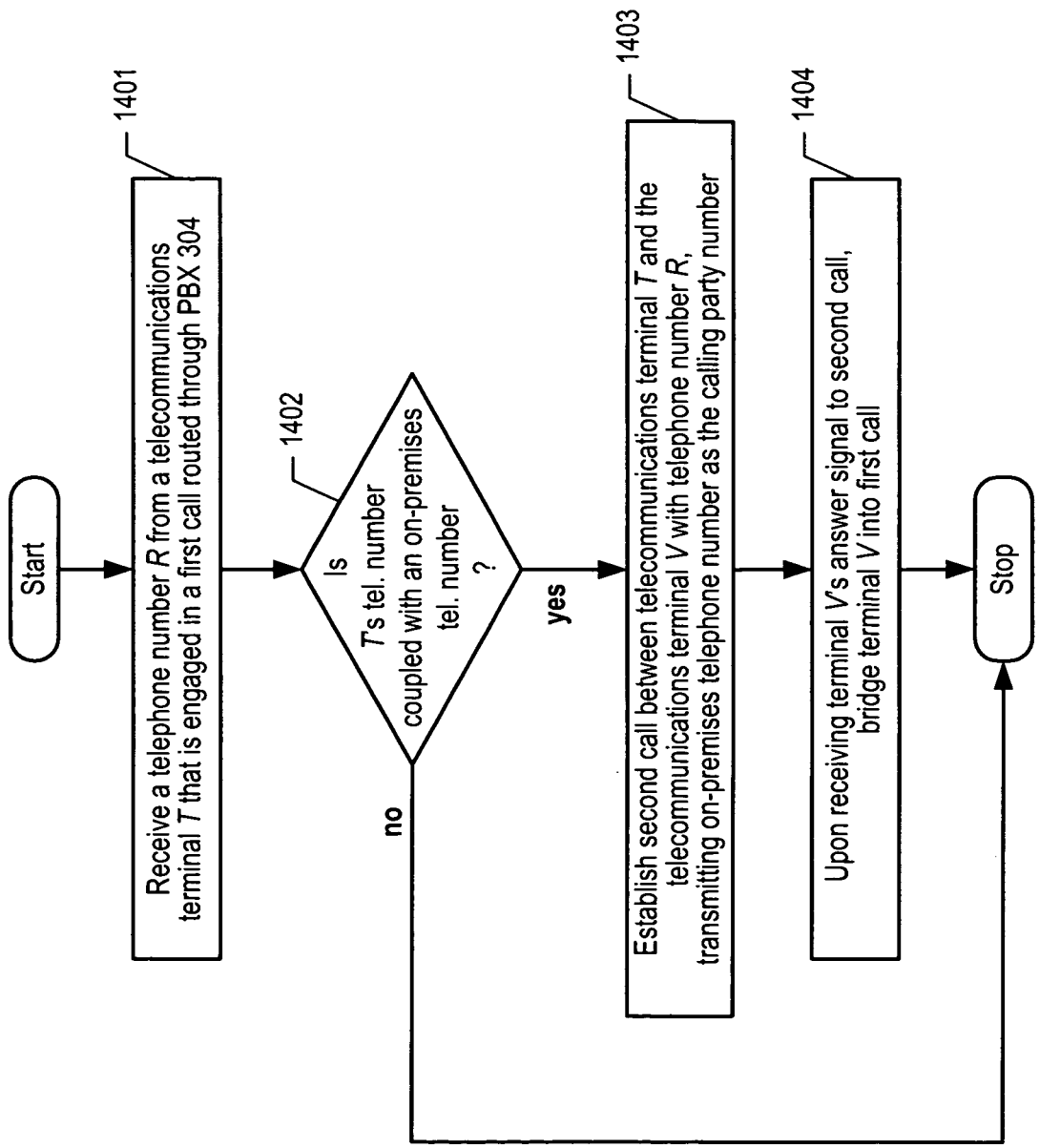
FIG. 14 depicts a flowchart of the salient tasks associated with a spoofed "conference on answer" initiated by an off-premises telecommunications terminal, in accordance with the illustrative embodiment of the present invention, in accordance with the illustrative embodiment of the present invention.

FIG. 14 depicts a flowchart of the salient tasks associated with a spoofed "conference on answer" initiated by an off-premises telecommunications terminal, in accordance with the illustrative embodiment of the present invention, in accordance with the illustrative embodiment of the present invention. When a "conference on answer" is initiated at a first telecommunications terminal that is already engaged in a first call, the first terminal calls a second telecommunications terminal, and once the call is "picked up" at the second terminal, the second terminal is bridged into (or equivalently, "conferenced into" or "added to") the existing first call. In a spoofed conference on answer, the calling party number of the call to the second terminal is a spoofed telephone number instead of the telephone number of the first terminal. It will be clear to those skilled in the art which tasks depicted in FIG. 14 can be performed simultaneously or in a different order than that depicted.

At task 1401, private branch exchange 304 receives a telephone number R from an off-premises telecommunications terminal T that is engaged in a first call made through private branch exchange 304. A second telecommunications terminal, which is possibly another off-premises telecommunications terminal, is also engaged in the call. In accordance with the illustrative embodiment, private branch exchange 304 receives telephone number R in accordance with FIGS. 9 and 11: off-premises telecommunications terminal T calls a feature name extension that corresponds to initiating a "conference on answer"; private branch exchange 304 transmits a confirmation signal to terminal T; and terminal T transmits telephone number R to private branch exchange 304, indicating that R is the telephone number of the terminal to conference into the first call. As will be appreciated by those skilled in the art, in some other embodiments private branch exchange 304 might receive telephone number R from terminal T by a method that does not involve calling a feature name extension (e.g., through a menu of an interactive voice response system, etc.), and it will be clear to those of ordinary skill in the art how to make and use such embodiments after reading this specification.

At task 1402, private branch exchange 304 checks whether off-premises telecommunications terminal T's telephone number is coupled with an on-premises telephone number in mapping 501 of memory 403. If this is the case, execution continues at task 1403, otherwise the method of FIG. 14 terminates.

At task 1403, private branch exchange 304 establishes a second call between off-premises telecommunications terminal T and the telecommunications terminal V with telephone number R, in well-known fashion. In establishing the second call, private branch exchange 304 transmits the on-premises telephone number identified at task 1402 as the calling party number. As will be appreciated by those skilled in the art, in some other embodiments of the present invention another on-premises telephone number (e.g., a "main office number" associated with private branch exchange 304, etc.) might be transmitted as the calling party number and provide desired spoofing.

At task 1404, private branch exchange 304 receives telecommunications terminal V's answer signal to the second call and, in response, bridges terminal V into the first call, in well-known fashion. After task 1404, the method of FIG. 14 terminates.

Figure 15:
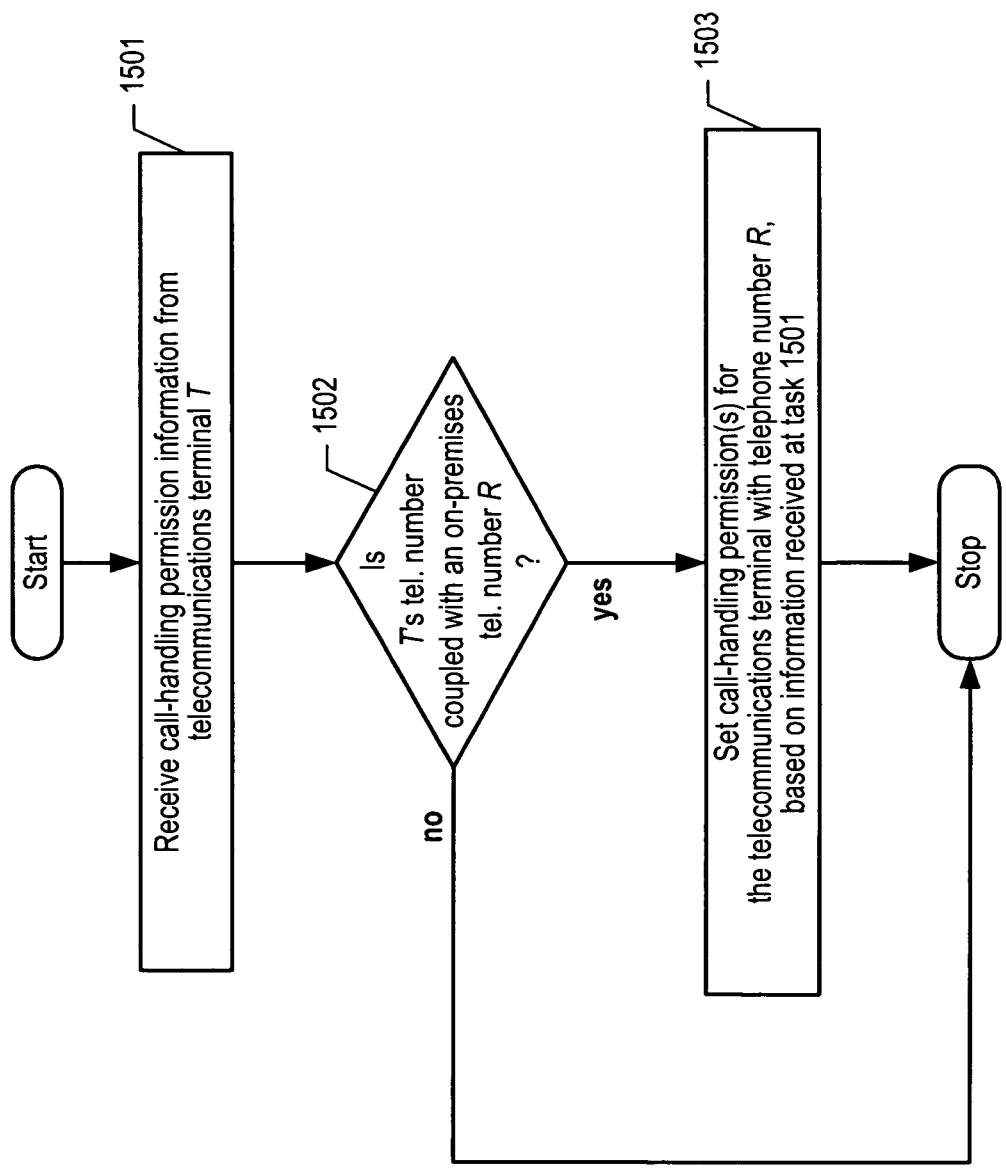
FIG. 15 depicts a flowchart of the salient tasks associated with an off-premises telecommunications terminal setting one or more call-handling permissions for its corresponding on-premises telecommunications terminal, in accordance with the illustrative embodiment of the present invention.

FIG. 15 depicts a flowchart of the salient tasks associated with an off-premises telecommunications terminal setting one or more call-handling permissions for its corresponding on-premises telecommunications terminal, in accordance with the illustrative embodiment of the present invention. It will be clear to those skilled in the art which tasks depicted in FIG. 15 can be performed simultaneously or in a different order than that depicted.

At task 1501, private branch exchange 304 receives information from an off-premises telecommunications terminal T for setting one or more call-handling permissions for the on-premises terminal with which T is coupled. In accordance with the illustrative embodiment, private branch exchange 304 receives this signal in accordance with FIGS. 9 and 11: off-premises telecommunications terminal T calls a feature name extension that corresponds to setting call permissions; private branch exchange 304 transmits a confirmation signal to terminal T; and terminal T transmits digits to private branch exchange 304 that indicate the call-handling permissions. As will be appreciated by those skilled in the art, in some other embodiments private branch exchange 304 might receive call-handling permissions from terminal T by a method that does not involve calling a feature name extension (e.g., through a menu of an interactive voice response system, etc.), and it will be clear to those of ordinary skill in the art how to make and use such embodiments after reading this specification.

At task 1502, private branch exchange 304 checks whether off-premises telecommunications terminal T's telephone number is coupled with an on-premises telephone number R in mapping 501 of memory 403. If this is the case, execution continues at task 1503, otherwise the method of FIG. 15 terminates.

At task 1503, private branch exchange 304 sets call-handling permission(s) in mapping 501 of memory 403 for the on-premises telecommunications terminal with telephone number R, based on the information received at task 1501, in well-known fashion. After task 1503, the method of FIG. 15 terminates.

Figure 16:
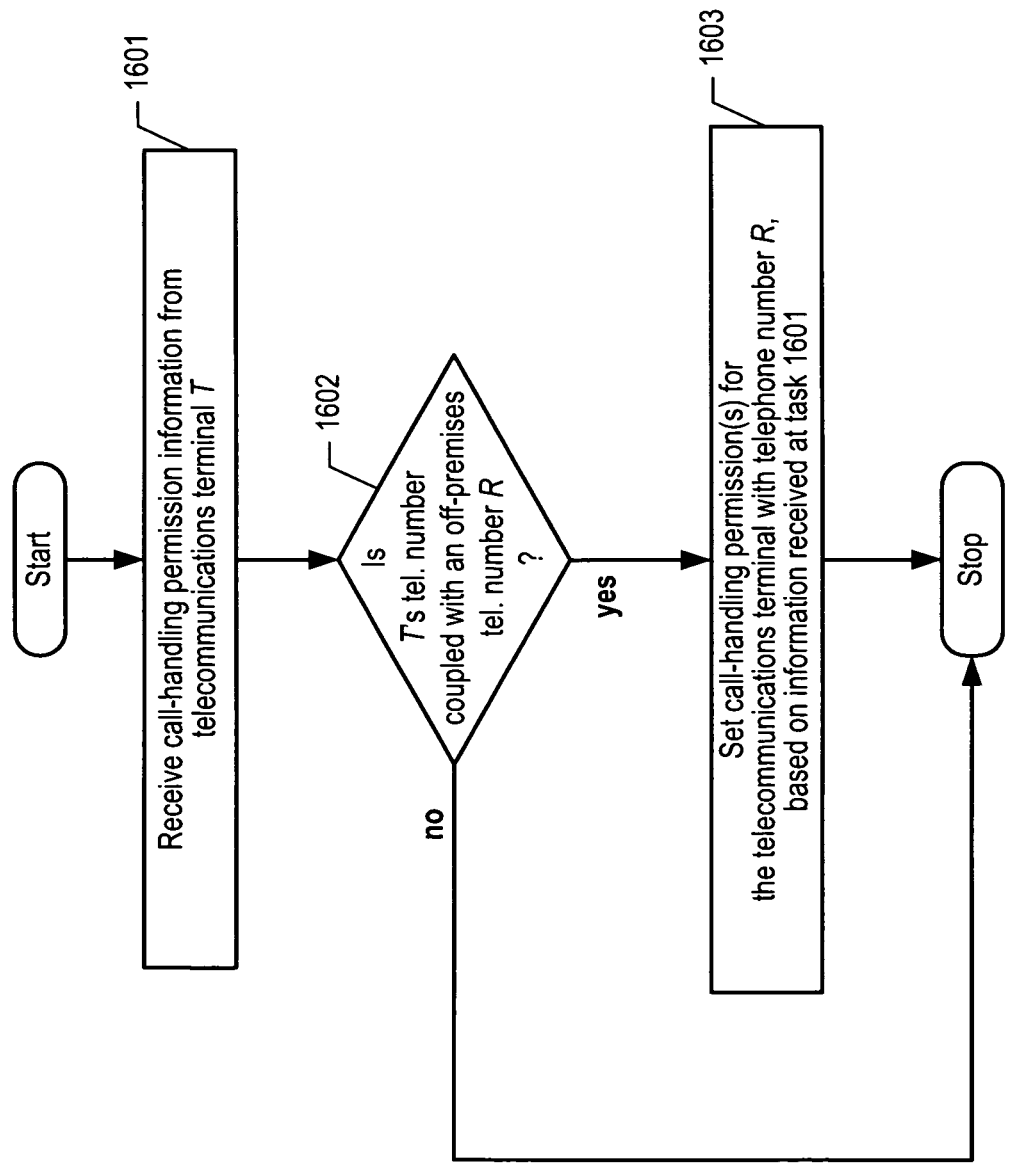
FIG. 16 depicts a flowchart of the salient tasks associated with an on-premises telecommunications terminal setting one or more call-handling permissions for its corresponding off-premises telecommunications terminal, in accordance with the illustrative embodiment of the present invention.

FIG. 16 depicts a flowchart of the salient tasks associated with an on-premises telecommunications terminal setting one or more call-handling permissions for its corresponding off-premises telecommunications terminal, in accordance with the illustrative embodiment of the present invention. It will be clear to those skilled in the art which tasks depicted in FIG. 16 can be performed simultaneously or in a different order than that depicted.

At task 1601, private branch exchange 304 receives information from an on-premises telecommunications terminal T for setting one or more call-handling permissions for the off-premises terminal with which T is coupled. In accordance with the illustrative embodiment, private branch exchange 304 receives this signal in accordance with FIGS. 9 and 11: on-premises telecommunications terminal T calls a feature name extension that corresponds to setting call permission; private branch exchange 304 transmits a confirmation signal to terminal T; and terminal T transmits digits to private branch exchange 304 that indicate the call-handling permissions. As will be appreciated by those skilled in the art, in some other embodiments private branch exchange 304 might receive call-handling permissions from terminal T by a method that does not involve calling a feature name extension (e.g., through a menu of an interactive voice response system, etc.), and it will be clear to those of ordinary skill in the art how to make and use such embodiments after reading this specification.

At task 1602, private branch exchange 304 checks whether on-premises telecommunications terminal T's telephone number is coupled with an off-premises telephone number R in mapping 501 of memory 403. If this is the case, execution continues at task 1603, otherwise the method of FIG. 16 terminates.

At task 1603, private branch exchange 304 sets call-handling permission(s) in mapping 501 of memory 403 for the off-premises telecommunications terminal with telephone number R, based on the information received at task 1601, in well-known fashion. After task 1603, the method of FIG. 16 terminates.

Figure 17:
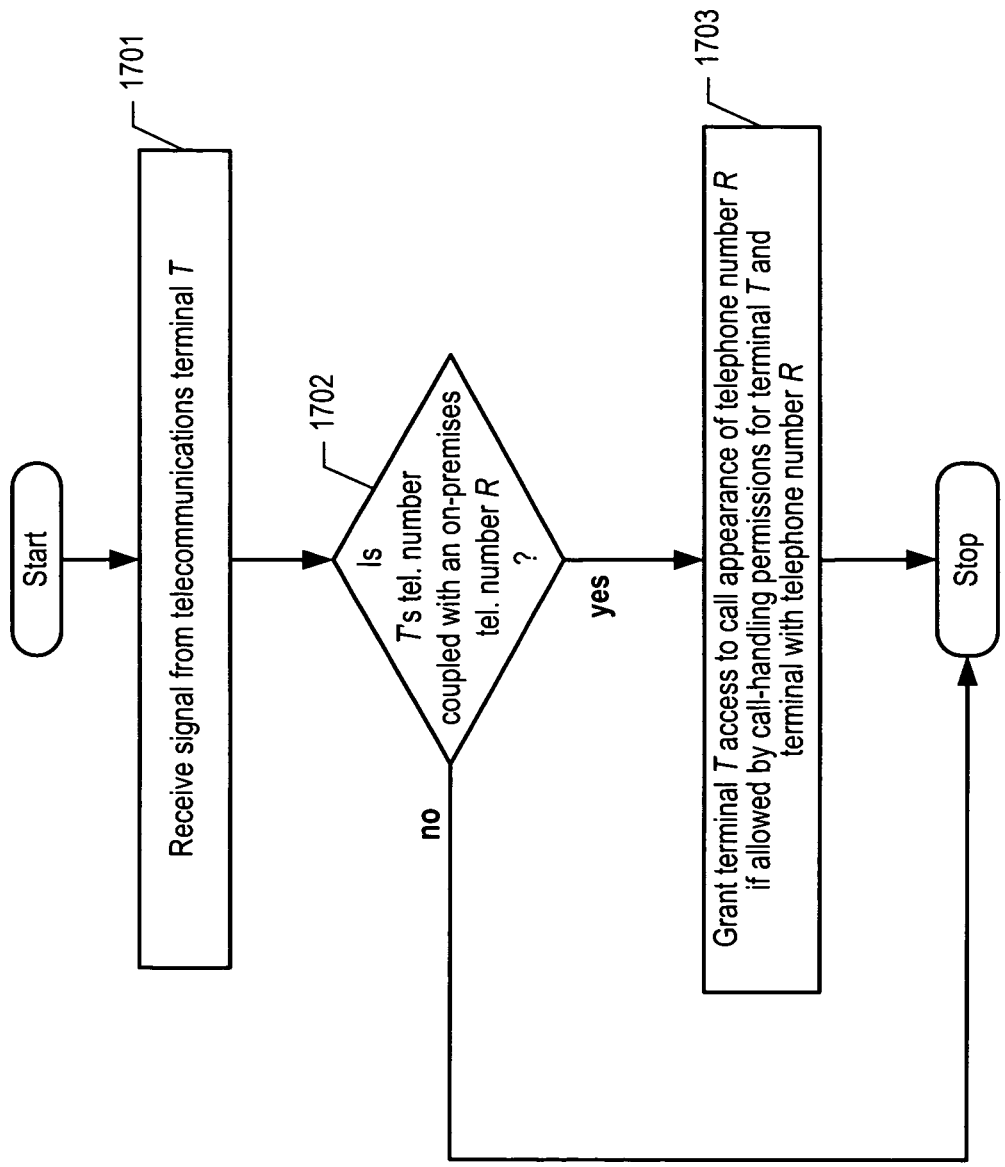
FIG. 17 depicts a flowchart of the salient tasks associated with granting an off-premises telecommunications terminal access to a call appearance of a corresponding on-premises telephone number, in accordance with the illustrative embodiment of the present invention.

FIG. 17 depicts a flowchart of the salient tasks associated with granting an off-premises telecommunications terminal access to a call appearance of a corresponding on-premises telephone number, in accordance with the illustrative embodiment of the present invention. It will be clear to those skilled in the art which tasks depicted in FIG. 17 can be performed simultaneously or in a different order than that depicted.

At task 1701, private branch exchange 304 receives a signal from an off-premises telecommunications terminal T that requests access to a call appearance of its corresponding on-premises telephone number. In accordance with the illustrative embodiment, private branch exchange 304 receives this signal when off-premises telecommunications terminal T calls a feature name extension that corresponds to accessing call appearances. As will be appreciated by those skilled in the art, in some other embodiments private branch exchange 304 might receive this signal from terminal T by a method that does not involve calling a feature name extension (e.g., through a menu of an interactive voice response system, etc.), and it will be clear to those of ordinary skill in the art how to make and use such embodiments after reading this specification.

Private branch exchange 304 receives from terminal T the type of call appearance to be accessed. The appearance that is requested by terminal T can be: (i) handling an active call, (ii) handling a held call, or (iii) idle. Active calls, calls on hold, and idle call appearances are well-known in the art.

At task 1702, private branch exchange 304 checks whether off-premises telecommunications terminal T's telephone number is coupled with an on-premises telephone number R in mapping 501 of memory 403. If this is the case, execution continues at task 1703, otherwise the method of FIG. 17 terminates.

At task 1703, private branch exchange 304 checks whether the call-handling permissions for terminal T and optionally, for one or more other terminals allow terminal T to gain access to the requested active, held, or idle call appearance of telephone number R, and if so, grants terminal T access in well-known fashion. After task 1703, the method of FIG. 17 terminates.

If terminal T requested access to an appearance that is handling a held call and if there is more than one held call associated with telephone number R, private branch exchange 304, in some embodiments, grants access to the held call appearance that is found first (e.g., on the lowest numbered call appearance, etc.).

Figure 18:
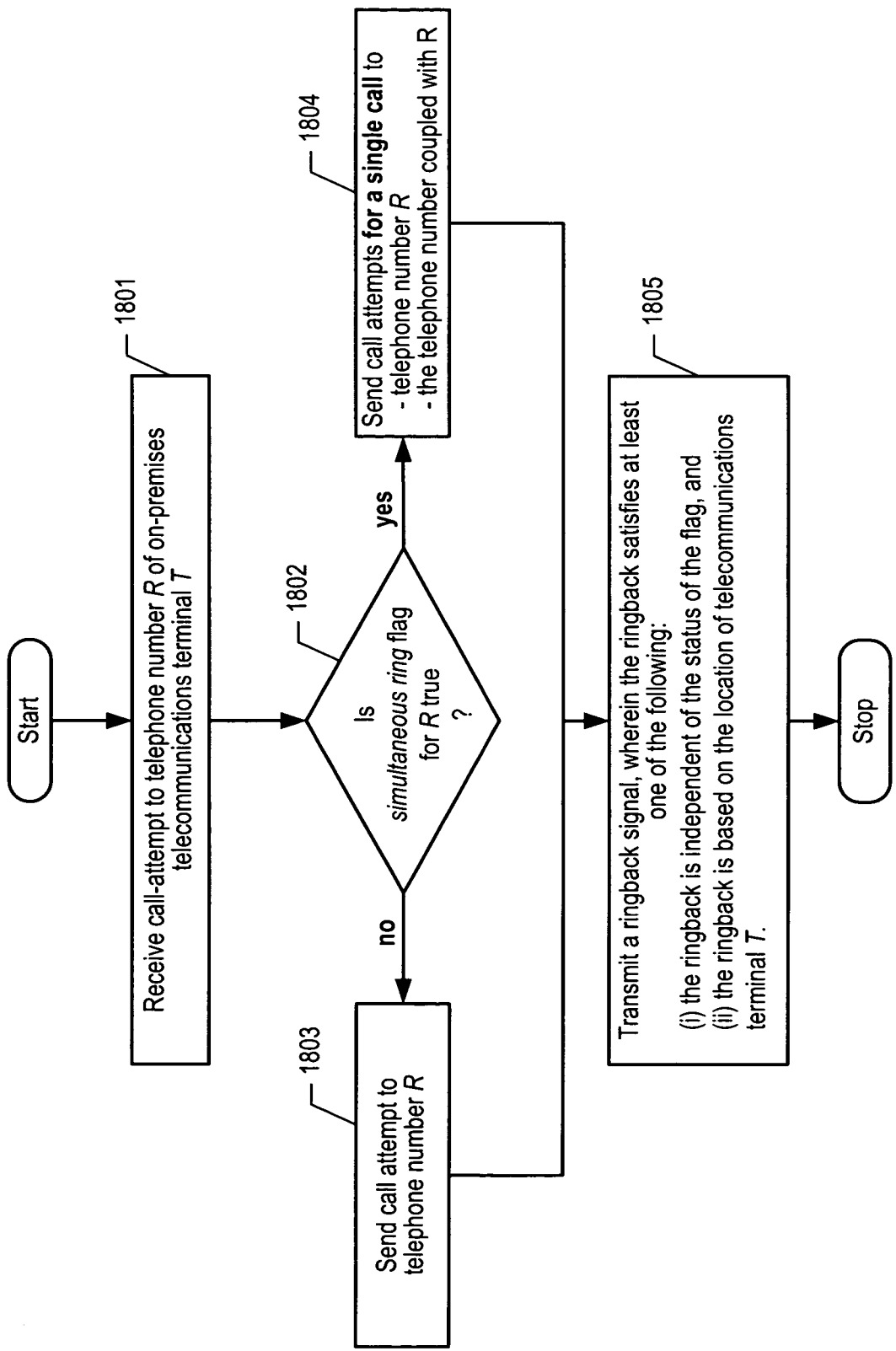
FIG. 18 depicts a flowchart of the salient tasks associated with handling a call attempt to an on-premises telephone number, in accordance with the illustrative embodiment of the present invention.

FIG. 18 depicts a flowchart of the salient tasks associated with handling a call attempt to an on-premises telephone number, in accordance with the illustrative embodiment of the present invention.

At task 1801, private branch exchange 304 receives a call attempt to a telephone number R of an on-premises telecommunications terminal T, in well-known fashion.

At task 1802, private branch exchange 304 checks the value of a simultaneous ring flag in field 605-n, where n is the index that corresponds to on-premises telephone number R. The flag indicates whether the corresponding off-premises terminal is to be sent and alerted of the call attempt, in addition to sending the call attempt to on-premises telecommunications terminal T. If the value of this flag is true, then execution continues at task 1804, otherwise execution continues at task 1803.

At task 1803, private branch exchange 304 transmits the call attempt received at task 1801 to on-premises telephone number R only, in well-known fashion. After task 1803, the method of FIG. 18 terminates.

At task 1804, private branch exchange 304 transmits the call attempt received at task 1801 to both on-premises telephone number R and the off-premises telephone number R' that is coupled with telephone number R, as indicated in mapping 501 of memory 403. When the call attempt is transmitted to both R and R', both telecommunications terminal T and the off-premises terminal whose telephone number is R' will "ring" until one of these two terminals answers the call, in well-known fashion. After task 1804, the method of FIG. 18 terminates.

At task 1805, private branch exchange 304 transmits a ringback signal to telecommunications network 305, in well-known fashion. The ringback is intended for the originator of the call. The ringback signal is independent of the status of the simultaneous ring flag, in accordance with the illustrative embodiment of the present invention. In some alternative embodiments, private branch exchange 304 provides the status of the flag to telecommunications network 305, and the actual ringback to be provided to the originator of the call is determined by a telecommunications service provider.

As part of a strategy for providing ringback, it is typically advantageous for embodiments of the present invention to withhold the fact that a call is extended to an off-premises telecommunications terminal, assuming that the telecommunications service provider that handles the call offers advanced ringback services. For example, co-pending U.S. patent application Ser. No. 11/028,997 titled "Location-Based Ringbacks" and filed on Jan. 4, 2005, which is incorporated by reference, discloses a telecommunications system in which a call originator receives a ringback signal that is based on the location of the called terminal. In order to maintain the illusion that a user who answers the call off-premises is actually on-premises, therefore, private branch exchange 304's extension of the call to the off-premises terminal should not be visible to the outside telecommunications network (i.e., network 305).

In some embodiments, private branch exchange 304 bases the ringback information on the location of on-premises telecommunications terminal T, such as when the terminal T is wireless and is roaming the area that is served by private branch exchange 304.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiment of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiment. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   receiving a telephone number R from one of (i) a first telecommunications terminal and (ii) a second telecommunications terminal;
   uniquely associating the telephone number R to a corresponding telecommunications feature by use of a telephone number R to telecommunications feature mapping, wherein the corresponding telecommunications feature is one of a plurality of telecommunications features;
   setting a flag for the telecommunications feature for the other one of (i) the first telecommunications terminal and (ii) the second telecommunications terminal;
   wherein the first telecommunications terminal's telephone number T1 exists within the address space of the Public Switched Telephone Network; and
   wherein the second telecommunications terminal's telephone number T2 exists within the address space of a private branch exchange telephone system; and
   wherein the first telecommunications terminal's telephone number T1 is coupled with the second telecommunications terminal's telephone number T2; and
   wherein the telephone number R is different from the first telecommunications terminal's telephone number T1 and the second telecommunications terminal's telephone number T2.

2. The method of claim 1 wherein the flag indicates whether the second telecommunications terminal is permitted to join a call made to the second telecommunications terminal's telephone number T2, wherein the call has been answered by the first telecommunications terminal.

3. The method of claim 1 wherein the flag indicates whether the second telecommunications terminal is permitted to remain on a call made to the second telecommunications terminal's telephone number T2, wherein the call has been answered by the first telecommunications terminal.

4. The method of claim 1 wherein the flag indicates whether the first telecommunications terminal is permitted to activate a telecommunications feature of the private branch exchange telephone system.

5. The method of claim 1 wherein the flag indicates whether the first telecommunications terminal is permitted to deactivate a telecommunications feature of the private branch exchange telephone system.

6. The method of claim 1 further comprising dropping the second telecommunications terminal from a call made to the second telecommunications terminal's telephone number T2.

7. A method comprising:
   receiving a telephone number R from one of (i) a first telecommunications terminal and (ii) a second telecommunications terminal;
   uniquely associating the telephone number R to a corresponding telecommunications feature by use of a telephone number R to telecommunications feature mapping, wherein the corresponding telecommunications feature is one of a plurality of telecommunications features;
   setting a flag for the telecommunications feature for the other one of (i) the first telecommunications terminal and (ii) the second telecommunications terminal;
   wherein the first telecommunications terminal's telephone number Ti exists within the address space of a first telecommunications network; and
   wherein the second telecommunications terminal's telephone number T2 exists within the address space of a second telecommunications network; and
   wherein the first telecommunications terminal's telephone number T1 is coupled with the second telecommunications terminal's telephone number T2; and
   wherein the telephone number R is different from the first telecommunications terminal's telephone number T1 and the second telecommunications terminal's telephone number T2.

8. The method of claim 7 wherein the first telecommunications network is the Public Switched Telephone Network.

9. The method of claim 7 wherein the second telecommunications network is a private branch exchange telephone system.

10. The method of claim 7 wherein the flag indicates whether the second telecommunications terminal is permitted to join a call made to the second telecommunications terminal's telephone number T2, wherein the call has been answered by the first telecommunications terminal.

11. The method of claim 7 wherein the flag indicates whether the second telecommunications terminal is permitted to remain on a call made to the second telecommunications terminal's telephone number T2, wherein the call has been answered by the first telecommunications terminal.

12. The method of claim 7 wherein the flag indicates whether the first telecommunications terminal is permitted to activate a telecommunications feature of the second telecommunications network.

13. The method of claim 7 wherein the flag indicates whether the first telecommunications terminal is permitted to deactivate a telecommunications feature of the second telecommunications network.

14. The method of claim 7 further comprising dropping the second telecommunications terminal from a call made to the second telecommunications terminal's telephone number T2.

\* \* \* \* \*